US007356040B2

(12) United States Patent
Parra-Moyano et al.

(10) Patent No.: US 7,356,040 B2
(45) Date of Patent: Apr. 8, 2008

(54) COMMUNICATION SYSTEM, METHOD AND CONTROLLER FOR ROUTING CALLS WITHIN PRIVATE NETWORKS DISTRIBUTED AMONG GEOGRAPHICALLY DISTANT ZONES

(75) Inventors: Francisco Parra-Moyano, Madrid (ES); Javier Perez Fernandez, Madrid (ES); Jesus-Javier Arauz-Rosado, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1205 days.

(21) Appl. No.: 10/182,955

(22) PCT Filed: Jan. 10, 2001

(86) PCT No.: PCT/EP01/00237

§ 371 (c)(1),
(2), (4) Date: Dec. 24, 2002

(87) PCT Pub. No.: WO01/58091

PCT Pub. Date: Aug. 9, 2001

(65) Prior Publication Data

US 2004/0008710 A1 Jan. 15, 2004

(30) Foreign Application Priority Data

Feb. 4, 2000 (DE) .................... 100 04 811

(51) Int. Cl.
*H04M 7/00* (2006.01)
(52) U.S. Cl. .............. 370/422; 370/395.2; 370/395.31; 370/400; 370/402
(58) Field of Classification Search ........ 370/352–356, 370/373–374, 377–379, 381–385, 395.2, 370/395.3, 395.32, 401–405, 422, 395.31, 370/400, 402; 709/212–213, 220, 223, 227–229, 709/238, 244
See application file for complete search history.

(56) References Cited

U.S. PATENT DOCUMENTS 5,650,994 A * 7/1997 Daley ................... 370/259

(Continued)

FOREIGN PATENT DOCUMENTS

EP 0989705 A2 3/2000

(Continued)

OTHER PUBLICATIONS

Radhika R. Roy, "Distributed Gatekeeper Architecture of H.323-based Multimedia Telephony,", IEEE 1999, pp. 73-76.

(Continued)

*Primary Examiner*—Binh K. Tieu

(57) ABSTRACT

A controller (GK) of a communication system (SYS) including in each of a plurality of geographically distant zones (ZA, ZB, ZC) a zone-specific controller (GK) and one or more subscriber terminals (EP) comprises a controller characteristics memory (CCM) for storing at least a private network identifier (PNID), a private network configuration memory (PNCM) for storing the private network configuration, a private network configuration determing means (PMDM) for communicating with other controllers (GK) of the communication system to determine the private network configuration and a call router for routing a call setup message received from a subscriber terminal (EP-A$_3$) in one zone (ZA) to another subscriber terminal (EP-B$_2$) of another zone (ZB). Before setting-up a call or at repeated time intervals the private network configuration including the controllers and subscriber stations in all zones (ZA, ZB, ZC) which belong to the private network identified by the private network identifier (PNID) can be determined and this private network configuration is used for determining the location of the respective controller which serves the called subscriber station (EP-B$_2$).

23 Claims, 9 Drawing Sheets

U.S. PATENT DOCUMENTS

| | | | |
|---|---|---|---|
| 5,677,905 A * | 10/1997 | Bigham et al. | 370/395.21 |
| 5,740,075 A * | 4/1998 | Bigham et al. | 709/229 |
| 2005/0055108 A1 * | 3/2005 | Gonzales et al. | 700/22 |
| 2005/0059390 A1 * | 3/2005 | Sayers et al. | 455/425 |

FOREIGN PATENT DOCUMENTS

| | | |
|---|---|---|
| WO | WO 98/59467 | 12/1998 |

OTHER PUBLICATIONS

Tyler Miller Johnson, et al., "A Global Alphanumeric Naming Scheme for H.323", Request for Comment, Jul. 12, 1999.

Senthil Sengodan, "On the Use of Multicast for Gatekeeper Discovery", Jun. 8-11, 1998, ITU-T Telecommunication Standardization Sector.

Radhika R. Roy, "Framework for H.323 Inter-Gaterkeeper Communications", ITU-T Telecommunication Standardization Sector, Jun. 8-11, 1998, pp. 1-8.

Sam Kotha, "Deploying H.323 Applications in Cisco Networks", Cisco White Paper, 1998, pp. 1-14.

"A Primer on the H.323 Standard", DataBeam Corporation White Paper, May 15, 1998, pp. 1-17.

* cited by examiner

FIG. 9a

"BELONGS TO PN1"

| RAS-TA | RA | CNCT |
|---|---|---|
| RAS TRANSPORT ADDRESS | E.164 RANGE | END-TO-END PATH |
| <GK-A's TRANSPORT ADDRESS> | 840 | JA |
| <GK-B's TRANSPORT ADDRESS> | 850-859 | JA |
| ... ... | ... ... | ... |
| <GK-n's TRANSPORT ADDRESS> | 860,870,880-889 | JA |

"BELONGS TO PN1"

| RAS-TA | RA |
|---|---|
| RAS TRANSPORT ADDRESS | E.164 RANGE |
| <GK-A's TRANSPORT ADDRESS> | 840 |
| <GK-B's TRANSPORT ADDRESS> | 850-859 |
| ... ... | ... ... |
| <GK-n's TRANSPORT ADDRESS> | 860,870,880-889 |

~TB2

CNCT

| RAS TRANSPORT ADDRESS |
|---|
| <GK-A's TRANSPORT ADDRESS> |
| ... ... |
| <GK-D's TRANSPORT ADDRESS> |
| ... ... |
| <GK-n's TRANSPORT ADDRESS> |

~TB3

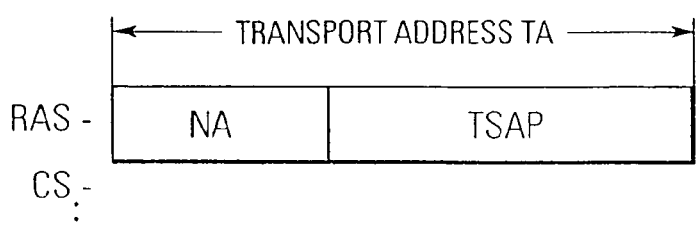

FIG.10a

Modified GRQ message

GatekeeperRequest::= SEQUENCE- (GRQ)
{
requestSeqNum RequestSeqNum,
--other fields as in H.225.0v2, pag. 122
endpointAlias SEQUENCE OF AliasAdress OPTIONAL, ....,
alternateEndpoints SEQUENCE OF Endpoint OPTIONAL, endpointVendor VendorIdentifier OPTIONAL, ← Parameter according to the invention tokens SEQUENCE OF ClearToken OPTIONAL,
cryptoTokens SEQUENCE OF CryptoH323Token OPTIONAL,
authentication Capability SEQUENCE OF
AuthenticationMechanism OPTIONAL,
algorithmOIDsSEQUENCE OF OBJECT IDENTIFIER OPTIONAL,
integritySEQUENCE OF IntegrityMechanism OPTIONAL,
integrityCheckValueICV OPTIONAL
}

FIG.10b

Modified GCF message

GatekeeperConfirm::= SEQUENCE- (GCF)
{
requestSeqNum RequestSeqNum,
--other fields as in H.225.0v2, pag. 122
endpointAlias SEQUENCE OF AliasAdress OPTIONAL, ....,
alternateEndpoints SEQUENCE OF Endpoint OPTIONAL, endpointVendor VendorIdentifier OPTIONAL, ← Parameter according to the invention tokens SEQUENCE OF ClearToken OPTIONAL,
cryptoTokens SEQUENCE OF CryptoH323Token OPTIONAL,
authentication Capability SEQUENCE OF
AuthenticationMechanism OPTIONAL,
algorithmOIDsSEQUENCE OF OBJECT IDENTIFIER OPTIONAL,
integritySEQUENCE OF IntegrityMechanism OPTIONAL,
integrityCheckValueICV OPTIONAL
}

FIG.11a

RAS-TA | RA

| RAS TRANSPORT ADDRESS | E.164 RANGE |
|---|---|
| <GK-1's TRANSPORT ADDRESS> | 840 |
| <GK-n's TRANSPORT ADDRESS> | 860,870,880-889 |

TB2

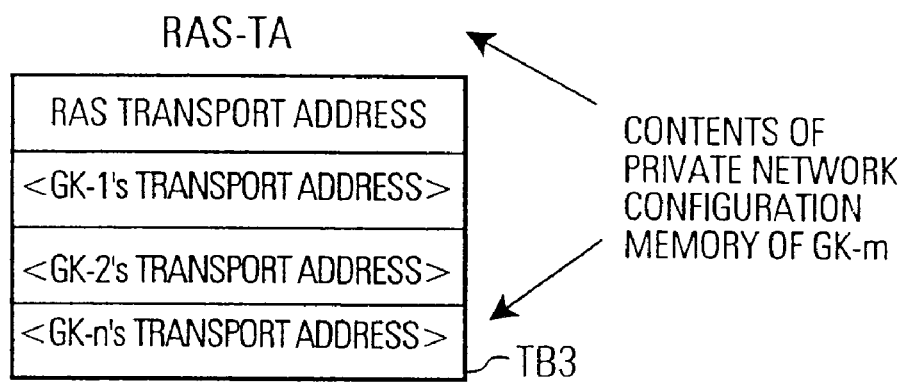

RAS-TA

| RAS TRANSPORT ADDRESS |
|---|
| <GK-1's TRANSPORT ADDRESS> |
| <GK-2's TRANSPORT ADDRESS> |
| <GK-n's TRANSPORT ADDRESS> |

TB3

CONTENTS OF PRIVATE NETWORK CONFIGURATION MEMORY OF GK-m

FIG.11b

RAS-TA

| RAS TRANSPORT ADDRESS | E.164 RANGE |
|---|---|
| <GK-B TRANSPORT ADDRESS> | 840 |

TB2

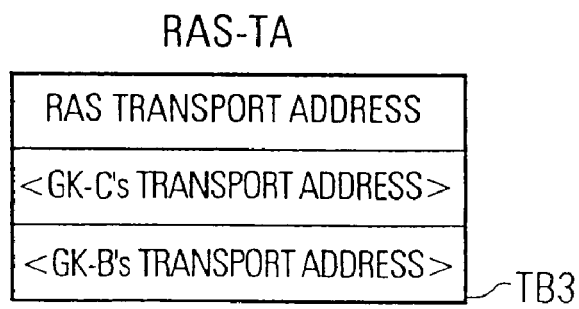

RAS-TA

| RAS TRANSPORT ADDRESS |
|---|
| <GK-C's TRANSPORT ADDRESS> |
| <GK-B's TRANSPORT ADDRESS> |

TB3

COMMUNICATION SYSTEM, METHOD AND CONTROLLER FOR ROUTING CALLS WITHIN PRIVATE NETWORKS DISTRIBUTED AMONG GEOGRAPHICALLY DISTANT ZONES

FIELD OF THE INVENTION

The present invention relates to a communication system, a method and a controller for routing calls between individual subscriber terminals (endpoints) belonging to the same private network, wherein the communication system can comprise one or more private networks which are distributed respectively at a plurality of geographically distant zones. In the individual zones respectively a number of subscriber terminals and a zone-specific controller controlling the signaling traffic between these subscriber terminals in each zone and between different zones is provided.

Such private networks are widely employed for example as cooperate networks when a company has several subsidiaries at several geographically distant locations, possibly in different countries. For example, if a company has its headquarters in Sweden and has subsidiaries in Germany and Spain, then within these subsidiaries (zones) there will be respectively a controller which is responsible for handling the signaling traffic which is necessary to route e.g. a call originating from the Spanish subsidiary in Madrid to the headquarters in Stockholm. The advantage of such cooperate networks or private networks is that the respective subscribers are only charged at the local tariff rather than at long distance charges.

However, according to some prior are solution, as explained below, there are many disadvantages in such conventional communication systems, e.g. regarding the amount of signaling necessary to set up a call, the hardware which is needed in each controller, the time to set up a call and security aspects.

Although hereinafter in the description of the prior art as well as in the description of the invention special examples with respect to the well-known ITU-T H.323 and H.323v2 standards are described, it should be noted that the invention is generally applicable to any communication system comprising one or more private networks as explained above. That is, whilst the present invention in particular relates to the Voice over Internet Protocol technology (hereinafter also referred to SV/IP) within the frame work of the ITU-T H.323 and H.323v2 standards, the invention can be applied to any corporate multimedia network, circuit switched network or package switched network, where dedicated controllers (hereinafter also called gatekeepers) control the signaling traffic between the subscriber terminals, e.g. the H.323 endpoints.

BACKGROUND OF THE INVENTION

FIG. 1 shows a quite common scenario of a communication system SYS for a voice communications infra-structure in corporate networks making use of both a circuit switched telephony network (hereinafter called the voice network) and a V/IP infrastructure composed of H.323 terminals, gateways and possibly controllers (gatekeepers) running over the corporate data network) hereinafter called the multimedia network).

In FIG. 1 the communication system SYS includes in each of a plurality of geographically distant zones A, B, C respectively a zone-specific controller GK-A, GK-B, GK-C and one or more subscriber terminals (endpoints) EP-A1, EP-A2, EP-A3; EP-B1, EP-B2; EP-C1. The subscriber terminals are respectively connected to each other and to the respective zone controller via a zone-specific bus network A-bus, B-bus, C-bus. A number of routers RA, RB, RC respectively connect the network buses to a first interconnection network INET1. For the first interconnection network INET1 any corporate Wide Area Network WAN, e.g. a corporate multimedia network, a circuit switched network or a packet switched network can be used. Of course, to the private network not only the interconnection network INET1 but also the subscriber terminals, the controllers (gatekeepers) and routers belong which are distributed among a plurality of different geographically distant locations. When the private (multimedia network) is distributed amongst a plurality of locations or zones and is quite extensive, e.g. regarding the numbers of users, each zone ZA, ZB, ZC must include a controller, e.g. so called H.323 gatekeepers, for controlling the bandwidth and the signaling traffic of the network between the subscriber terminals, e.g. the H.323 endpoints, in the network.

For example, as already mentioned above, when the owner of such a private multimedia network or communication system SYS has different subsidiaries in several geographically distant locations (zones), each controller GK-A, GK-B, GK-C is in charge of each zone to hold information about the addresses or calling numbers in such a zone, wherein all these zones are interconnected by means of a corporate WAN, namely the first interconnection network INET1.

Although it is possible that all zones ZA, ZB, ZC belong to the same private multimedia network proprietor, it is also possible that only zones ZA, ZB belong to the private multimedia network of a particular proprietor, whilst one or more other zones ZC belong to yet a different proprietor. Finally, it should be noted that it is also possible that some zones, e.g. the zone ZA, contains subscriber terminals which are capable and have permission to communicate not only within its "own" private network but also within a private network of a further proprietor. All these different signaling procedures, in particular to set up a call between subscriber terminals in the same zone or in two different zones (so-called inter-zone calls) must be handled by the respective controller.

The controller in each zone holds information about all the addresses (calling numbers) of the subscriber terminals, or in the respective zone. More specifically, it holds the prefixes of the E.164 numbers that are assigned to the controller. As shown in FIG. 1, they are interconnected by means of the first interconnection network INET1. Whilst the interconnection network INET1 is sufficient to route calls between the subscriber terminals, there may be a second interconnection network INET2 connected to the respective bus networks A-bus, B-bus via interfaces, e.g. H.323 gateways GW-A, G-B. These telephone gateways convert the signaling on the bus networks, e.g. the H.323 signaling and the media, to whatever transmission standard is used in the voice network, e.g. TDMA, CDMA, etc. Therefore, in principle calls can of course be routed through the second interconnection network INET2 and the gateways GW-A, GW-B if a blocking situation occurs in the first interconnection network INET1.

In FIG. 3$a$ an example is shown for the H.323 standard, i.e. EP-A$_i$, EP-B$_j$ and EP-C$_k$ are generic H.323 endpoints (subscriber terminals) whereas GW-A and GW-B are telephony gateways. GK-A, GK-B and GK-C are H.323 controllers to control and communicate messages through the different networks INET1, INET2. Since within each location (zone) the controller GK-A, GK-B, GK-C takes care of the signaling traffic between the subscriber terminals, in particular the traffic to set up calls between the individual subscriber terminals belonging to the same private (multimedia) network SYS, generally the controller comprises a message sending means MSM and a message receiving means MRM for sending and receiving messages to/from other controllers (subscriber terminals). Such message sending and message receiving procedures will hereinafter be explained with reference to FIG. 2.

FIG. 2 shows three different examples of message sending/receiving between the individual gate keepers (controllers) when a subscriber station EP-$A_3$ (e.g. a H.323 endpoint) which belongs to the zone ZA controlled by the controller CK-A desires to place a call to another H.323 subscriber terminal EP-$B_2$ in the zone ZB controlled by its corresponding controller GK-B. Conventionally, according to the ITU-TH.323 standard, the controllers in charge of each zone must communicate with other controllers such that the controller GK-A of the calling party EP-$H_3$ knows where to in the private multimedia network the controller GK-A should route the call signaling for such a desired call. Hereinafter, if the call setup relates to the setting-up of the call between different zones, such a call will be called "inter-zone-call".

FIGS. 2a, 2b, 2c illustrate three different scenarios for routing the "inter-zone call" signaling and they respectively exhibit different disadvantages.

Direct Gatekeeper Routing (DGR)

In FIG. 2a, routing is illustrated which can be directly performed by the controller GK-A when the normal call procedure according to the H.323 standard is followed. In FIG. 2a a subscriber terminal EP-$A_3$ in zone ZA places an admission request message ARQ to its controller GK-A in step ST2a1. In step ST2a2 the controller GK-A returns an admission confirmation message ACF to the subscriber station EP-$A_3$. It should be noted that after step ST2a2 only the principle access or admission request has been granted and no routing numbers have been established or set. In step ST2a3 the subscriber terminal EP-$A_3$ issues a call setup message Setup in order to setup a call to the subscriber station EP-$B_2$. Such a setup message Setup from the subscriber terminal EP-$A_3$ must have normally inserted a calling number of the desired called subscriber terminal, e.g. a E.164 calling number. Although the message receiving means MRM in the controller GK-A clearly recognizes the desired calling number from analyzing the setup message Setup, it still does not actually know where the subscriber terminal EP-$B_2$ is located, e.g. the actual EP-$B_2$ address. The reason for this problem is because within a corporation subscribers may move around from location to location (zone to zone) and the gatekeeper GK-A can do nothing else but guessing from the calling number where the subscriber station is presently located. That is, the gatekeeper GK-A must guess the location of the gatekeeper which is currently serving the desired called subscriber station in order to relay the setup message Setup incoming from the originating endpoint to the correct gatekeeper.

Indirect Gatekeeper Routing (IGR)

Whilst FIG. 2a shows the conventional routing procedure according to the H.323 standard's GK-routed call model, FIG. 2b shows the setup procedure when the H.323 standard's endpoint-routed call model is used. In FIG. 2b the admission request message ARQ in step ST2b1 corresponds to the admission request message ARQ in step ST2a1 in FIG. 2a. However, after step ST2b1, the gatekeeper GK-A controlling the originating zone (GK-A) selects and delivers a so-called transport address (TA) to the calling subscriber terminal EP-$A_3$ in the admission confirmation message ACF. This transport address TA indicates to the originating H.323 subscriber terminal EP-$A_3$ a location to which the originating subscriber terminal EP-$A_3$ should send its call signaling. That is, the transport address indicates (the location of) a gate keeper GK-B which serves the desired called subscriber terminal EP-$B_2$ or in fact the called subscriber terminal itself. Of course, in FIG. 2b the controller GK-A controlling the originating zone GK-A might not know the transport address indicating the location of the destination controller GK-B or GK-C. As is well known and as is shown in FIG. 9b, the_Transport Address (abbreviated TA) is the logical address of an entity located on top of the Transport layer (layer 4) of a network, as defined by the ISO Open Systems Interconnection model.

However, even if the gatekeeper GK-A knew the destination gatekeeper GK-B or the transport address of the gatekeeper GK-B for delivery, in order to eventually reach the called subscriber station EP-$B_2$, the gatekeeper (controller) GK-A controlling the originating zone ZA has no information whatsoever regarding the availability status of the private multimedia network. Therefore, the gatekeeper GK-A cannot guess whether the setup message Setup from the originating subscriber station EP-$A_3$ should be forwarded to the known destination gatekeeper GK-B or alternatively to the originating telephony gateway G-A, such that the call would be routed through the second interconnection network INET2 (the voice networks) and the second telephony gateway GW-B. Such situation may for example occur if the private multimedia network is blocked or breaks down.

Multicast Signaling Procedures (MSP)

As explained above, in FIG. 2a and FIG. 2b there is still some uncertainty as to whether or not the correct terminating controller (gatekeeper) GB-B or its transport address can actually be found. A variation of the H.323 standard, namely the H.323v2 standard of ITU-T, also uses a multicast procedure in order to determine the terminating gatekeeper GK-B which is serving the destination H.323 subscriber terminal EP-$B_2$. Essentially, the multicast procedure is a multiple location inquiry procedure. FIG. 2c shows an example of this procedure.

In step ST2c1 the admission request message ARQ is sent to the controller GK-A which serves the originating subscriber terminal EP-$A_3$. In the admission request message ARQ and alias of EP-$B_2$ is inserted. The "alias" is some kind of identification of the called subscriber terminal EP-$B_2$, i.e. its calling number or another identification. Therefore, "alias" is a generic term for referring to an E.164 number, an e-mail address etc., what is to say any identifier that might be used to find the location of the terminal to which the alias is assigned.

The gatekeeper GK-A sends in step ST2c2 a so-called location request message LRQ to a special Multicast Discovery Transport Address MDTA of all gatekeepers GK-B, GK-C. First, the LRQ message is routed to the corporate network WAN in step ST2c2 and then a plurality of location request messages or location inquiry messages LRQ are respectively sent to the gatekeepers GK-B, GK-C in steps ST2c3, ST2c4. This procedure is called "multicast" since the same location inquiry message LRQ is sent to "multiple" locations. The Multicast Discovery Transport Address is defined in the H.323 standard and is used for the purpose of communication between controllers via "multicast". Each gatekeeper GK-B, GK-C knows the alias of all H.323 subscriber terminals which are served by the respective gatekeeper. When the received EP-B$_2$ alias and an H.323 subscriber terminal alias match, then a location confirmation message LCF or a location reject message LRJ (if the alias do not match) is returned to the inquiring gatekeeper GK-A in steps ST2c6 and ST2c5.

When the inquiring gatekeeper GK-A receives one location confirmation message LCF from one of the gatekeepers GK-B, GK-C it returns the admission confirmation message ACF to the calling subscriber terminal EP-A$_3$ in step ST2c7. As a result of this, the setup message Setup can be set in step ST2c8 by the calling subscriber terminal EP-A$_3$ and the gatekeeper GK-A can forward the setup message Setup in step ST2c9 to the gatekeeper GK-B which had returned the location confirmation message LCF. As can be seen from FIG. 2c, a large amount of signaling (inquiry and confirmation) messages are necessary in order to determine the gatekeeper according to the H.323v2 standard signaling procedures. In addition, the multicast procedures exhibit quite some significant disadvantages as listed below.

A first disadvantage is, that the identification of the gatekeeper which serves the desired called subscriber station involves the multicast procedure where multiple location request messages must be sent to all gatekeeper locations. Therefore, it may take a considerable time until a location confirmation message LCF is returned and furthermore, the complete procedure may fail depending on the packet load in the interconnection network INET1.

A second disadvantage is that many gatekeepers may be provided in different zones and must receive and answer the multicast messages LRQ, such that additional hardware must be provided in the gatekeepers in order to handle all the LRQ, LCF and LRJ messages, in particular if there are a large number of simultaneous subscriber terminals requesting a call setup.

A third disadvantage is, that the signaling as for example shown in FIG. 2c unavoidably occupies network resources to large extent (flooding the interconnection network INET1 with messages) because at least one multicast packet (LRQ message) must be distributed to all gatekeepers for a single inter-zone call).

A fourth disadvantage is, that unauthorized access to the system can be obtained simply by wire-tapping of the data network INET1 and by sending from a unauthorized gatekeeper unit unauthorized LCF messages as answer to intercepted or listened LRQ messages. Thus, the calling subscriber terminal may communicate with an unauthorized subscriber terminal via an unauthorized gatekeeper without knowing this.

A fifth disadvantage is that it is not possible to setup a virtual private network by assigning one or more H.323 zones to it since any other zone could become part of the virtual private network PN without restriction when the gatekeeper of that zone wanted it (it only has to subscribe to the multicast group).

Thus, the H.323 and H.323v2 standard of ITU-T has a slow call setup, requires additional processing capabilities in the gatekeeper, requires extensive signaling in the network, has a low security and it is impossible to set up a virtual private network.

PUBLISHED PRIOR ART

Apart from the above-mentioned H.323 and H.323v2 standard, WO 985 946 7 proposes another method for controlling the call setup in such a private multimedia network (communication network) SYS as shown in FIG. 1. Here, it is suggested to introduce a central zone management means (a "Meta-Gatekeeper") acting as a central control facility for controlling all gatekeepers in the individual zones from a central location. Call setup procedures and location request procedures are handled by the central zone management means. However, even with this solution there are still disadvantages.

Roy R. R.: "Distributed Gatekeeper Architecture for H.323-based Multimedia Telephony" ITU-T Telecommunication Standardization Sector of ITU,XX,XX, 1999, pages 73-76, XP002900979, proposes to facilitate the inter-gatekeeper communications with distributed gatekeeper architecture through acquiring knowledge of the destinations served by other GKs dynamically, of cache management, and of extension of the existing H.323 signaling messages. The only new field that needs to be added to extend the signaling message set is hopCount in order to avoid looping, especially in distributive environment similar to messages of Recommendation H.225.0 Annex G. The existing two fields defined in H.323v2 that need to be added to all signaling message sets are endpointType and gatekeeperIdentifier. This simple extension in the H.323 signaling message set will satisfy the needs for inter-gatekeeper communications.

Johnson et al: "A Global Alphanumeric Naming Scheme for H.323", Request for Comment, Jul. 12, 1999 (Jul. 12, 1999), XP002152855, describes a naming scheme, sometimes referred to as a dialing plan, for h.323 terminal end stations on the Internet, Internet2 and related networks. It includes provisions for both numeric and alphanumeric naming. A key feature of this dialing plan is that the address of the destination zone's gatekeeper is embedded in each name, thus providing a means for direct resolution of all names and eliminating the scalability problems of "advertised" or statically registered zones as described in Annex G of the h.323 standard. Another key provision is that this naming scheme is based upon existing infrastructures and does not require the formation of a body to administer names. Thus, all users on the network can immediately begin to implement the plan.

A first disadvantage is that a new additional entity, namely the "zone management means" needs to be provided in the communication system SYS and that the possibility of a failure is even increased due to the huge amount of signaling to be received by the centralized data base incorporated in the zone management means. If the single zone management means fails, then no calls at all can be set up.

A second disadvantage is, that the H.323 standard has to be modified regarding the message format in order to make the solution standard to all equipment suppliers. Such a substantial modification of the H.323 standard must be agreed by many parties and is therefore difficult.

A third disadvantage is that due to the additional provision of the zone management means a three-step procedure is necessary in order to setup and route a call. This leads to longer setup times and, as described above, may increase the possibility of a failure during call setup.

The problem addressed by the aforementioned WO 98 594 67 still exists today in H.323 networks. Only the H.323v2 standard proposes a solution for it but it has the fourth disadvantage that it becomes unmanageable inside a private network due to its security flaws and lack of scope control. This solution allows anyone in the Internet/Intranet to interfere with the process as a skilled person can derive from page 52 in the recommendation ITU-T H.323v2 dated February/1998.

A fifth disadvantage is that in the above PCT application and in the ITU-T H.323 standards, the H.323 subscriber station user must explicitly request the setup of the call through a gateway in his zone (and through the second interconnection network INET2) when the data network INET1 crashes or becomes unavailable for other reasons. In the open system environment (OSI) the gatekeepers are running from the application layer. This means, that the reason for a failure may simply be that the gatekeeper on the application layer has crashed whilst the data network is still working perfectly. However, the user cannot distinguish whether the gatekeeper or the data network has crashed. Therefore, a network- or transport-layer detection of the data network status (e.g. ping) cannot guarantee that an end-to-end H.323 signaling connection can be set up.

SUMMARY OF THE INVENTION

As explained above, conventionally it cannot be guaranteed, even with a large amount of signaling traffic in the communication system, that a call setup is made quickly and safely to the desired subscriber terminal. The reason for this is that the gatekeeper serving the originating subscriber terminal has (in real time)—when first receiving the admission request message—no information whatsoever about the availability of the private multimedia network and of the possible location of a gatekeeper serving the desired called subscriber station. That is, information as to whether or not in principle the call can be set up and where the gatekeeper is located serving the call subscriber terminal is only available after extensive signaling over the network.

Therefore, the object of the present invention is to provide a communication system, a controller and a method which ensure that a call setup requested by an originating subscriber terminal is safely made to the desired terminating subscriber terminal.

This object is solved by a controller (claim 1) of a communication system including a controller GK of a communication system SYS including in each of a plurality of geographically distant zones ZA, ZB, ZC a zone-specific controller GK and one or more subscriber terminals EP connected to each other via a zone-specific bus network BUS-A, BUS-D, BUS-C, said zone-specific bus networks being connected to each other via at least a first interconnection network WAN, wherein said controller GK controls the signaling traffic between the subscriber terminals E) in each zone and between different zones and comprises: a controller characteristics memory CCM for storing at least a private network identifier PNID of a private network PN to which said zone-specific controller GK and its connected subscriber terminals EP belong; a private network configuration memory PNCM for storing the private network configuration at least of the private network identified by the stored private network identifier PNID; a private network configuration determining means PNDM for communicating GRQ, GCF, GRJ with all other controllers (GK) of the communication system SYS to determine the private network configuration including those controllers GK and subscriber stations EP in other zones B, C which belong to the private network PN identified by the stored private network identifier PNID and to store corresponding private network configuration information TA; RA; CNCT in said private network configuration memory PNCM.

Furthermore, this object is solved by a controller (claim 10) of a communication system including a controller of a communication system SYS including in each of a plurality of geographically distant zones A, B, C a zone-specific controller GK and one or more subscriber terminals EP connected to each other via a zone-specific bus network BUS-A, BUS-D, BUS-C, said zone-specific bus networks being connected to each other via at least a first interconnection network WAN, wherein the controller GK controls the signaling traffic between the subscriber terminals EP in each zone and between different zones and comprises: a private network configuration memory PNCM for storing the private network configuration at least of the private network identified by a private network identifier PNID; and a call router CR for receiving from a subscriber terminal e.g. EP-$A_3$ connected to said controller GK a call setup message ARQ indicating a call setup to another subscriber terminal e.g. EP-$B_2$, for determining on the basis of the private network configuration information RASTA, RA, CNCT in the private network configuration memory PNCM the controller GK to which said called subscriber terminal e.g. EP-$B_2$ is connected, and for routing the call setup message ARQ to the determined controller.

The object is also solved by a communication system (claim 22) including a communication system SYS including in each of a plurality of geographically distant zones ZA, ZB, ZC a zone-specific controller GK and one or more subscriber terminals EP connected to each other via a zone-specific bus network BUS-A, BUS-D, BUS-C, said zone-specific bus networks being connected to each other via at least a first interconnection network WAN, wherein each zone-specific controller GK controls the signaling traffic between the subscriber terminals EP in each zones and between different zones and is constituted as defined above.

The object is also solved by a method (claim 23) for routing calls in a communication system SYS including in each of a plurality of geographically distant zones ZA, ZB, ZC a zone-specific controller GK and one or more subscriber terminals (EP) connected to each other via a zone-specific bus network BUS-A, BUS-D, BUS-C, said zone-specific bus networks being connected to each other via at least a first interconnection network WAN, wherein said controller GK controls the signaling traffic between the subscriber terminals EP in each zone and between different zones and carries out the following steps: storing in a controller characteristics memory CCM for storing at least a private network identifier PNID of a private network PN to which said zone-specific controller GK and its connected subscriber terminals EP belong; storing in a private network configuration memory PNCM for storing the private network configuration at least of the private network identified by the stored private network identifier PNID; and communicating GRQ, GCF, GRJ with all other controllers GK of the communication system SYS to determine the private network configuration including those controllers GK and subscriber stations EP in other zones (B, C) which belong to the private network PN identified by the stored private network identifier PNID and to store corresponding private network configuration information RASTA; RA; CNCT in said private network configuration memory PNCM.

The object is also solved by a method (claim 23) for call routing in a communication system SY) including in each of a plurality of geographically distant zones A, B, C a zone-specific controller GK and one or more subscriber terminals EP connected to each other via a zone-specific bus network BUS-A, BUS-D, BUS-C, said zone-specific bus networks being connected to each other via at least a first interconnection network WAN, wherein the controller GK controls the signaling traffic between the subscriber terminals EP in each zone and between different zones and carries out the following steps: storing a private network configuration memory PNCM for storing the private network configuration at least of the private network identified by a private network identifier PNID; and receiving from a subscriber terminal e.g. EP-A$_3$ connected to said controller GK a call setup message ARQ indicating a call setup to another subscriber terminal e.g. EP-B$_2$; determining on the basis of the private network configuration information RASTA, RA, CNCT in the private network configuration memory PNCM the controller GK to which said called subscriber terminal e.g. EP-B$_2$ is connected; and routing the call setup message (ARQ) to the determined controller.

According to a first aspect of the invention the controller can know in real-time whether the H.323 end-to-end signaling connection is possible over the multimedia network and therefore the gatekeeper can route the call through the voice network via the gateway in the zone under control of said gatekeeper. The information which is necessary, i.e. the private network configuration information is obtained by the private network configuration determining means via a signaling procedure with all the other controllers of the communication system. This kind of "discovery" procedure is carried out independently from the call setup procedures and can preferably be carried out repeatedly to update the information about the configuration stored in the private network configuration memory. Thus, the controllers are provided with means to figure out the availability status of the multimedia network, in real-time and with a fully configurable time accuracy.

According to a first embodiment of the first aspect of the invention, the availability status which the controllers can obtain according to the present invention consist of those controllers to which an end-to-end signaling path can be set up and which belong to the same private network as the gatekeeper doing the guess.

Furthermore, according to a second embodiment of the first aspect of the invention, availability status of gatekeepers belonging to other private networks and to which an end-to-end signaling path can be set up, can be obtained. These gatekeepers can subsequently be tried by the controller which has to route a call but has not been able to find out the route to follow by other means.

According to a second aspect of the invention a call router can use the private network configuration information stored in the private network configuration memory before setting up a call. That is, locally in the private network configuration memory some information is available that indicates not only the availability of the multimedia network but also information as to where the call setup message is best routed.

According to a first embodiment of the second aspect of the invention the calling number of the called subscriber terminal in the call setup message is compared with the ranges of calling numbers in said private network configuration memory and the corresponding RAS transport address and a network address of the controller to which the called subscriber terminal is connected is determined. The call router then routes the call setup message to the determined network address of the controller. Based on the comparison, if no match is found, according to this first embodiment of the second aspect, the controller can be used in order to re-route a given call through the additional second interconnection voice network when the multimedia network is out of order.

According to a second embodiment of the second aspect of the invention the call router can carry out a location-based call routing where the calling number in the call setup message is compared with ranges of calling numbers in said private network configuration memory and if no match is found a location inquiry message including a called subscriber terminal indication is sent to all controllers which are indicated as belonging to the private network as identified by the stored private network identifier and to which a direct signaling connection can be set up. Also in this case some information about the best possible choices for controllers is available on the basis of the configuration stored in the private network configuration memory.

The first and second aspect of the invention have the primary advantage that information for an optimal call routing can be collected beforehand and used for the call routing without flooding the first interconnection network with unnecessary signaling messages. Furthermore, the gatekeeper configuration can be kept easy and there is an increased security against gatekeeper identity forge attacks. Calls will always be routed to a desired destination, even if the multimedia network is down. There is also no necessity to provide an additional central zone management means because the information is collected and stored locally by the respective gatekeepers. Furthermore, since the information is stored locally, a complete database is distributed amongst the separate controllers. Furthermore, there is no necessity of any modification in the H.323 standard if the private multimedia network should comply with this standard. If a standardized solution is preferred, only a very small change in two single existing messages of the standard is enough.

Further advantageous embodiments and improvements of the invention are listed in the dependent claims. Hereinafter, embodiments of the present invention are described with reference to the attached drawings. What will be described below is what the inventors presently conceive as the best mode for carrying out the invention. However, the invention can comprise other embodiments and modifications not explicitly mentioned but obvious to a skilled person. For example, the invention can comprise embodiments which result from combinations of features which are separately described in the description and the claims.

BRIEF DESCRIPTION OF THE DRAWINGS

FIG. 9a shows how a private network configuration is stored in the private network configuration memory using a single table;

FIG. 9b shows how the private network configuration is stored in the private network configuration memory using two tables;

FIG. 10a, show GRQ and GCF messages according to H.323 10b standard modified in accordance with the invention;

FIG. 11a shows the entries in the two tables as shown in FIG. 9b for the example in FIG. 4; and FIG. 11b shows the entries in the two tables according to FIG. 9b for the example in FIG. 5.

Figure 1:
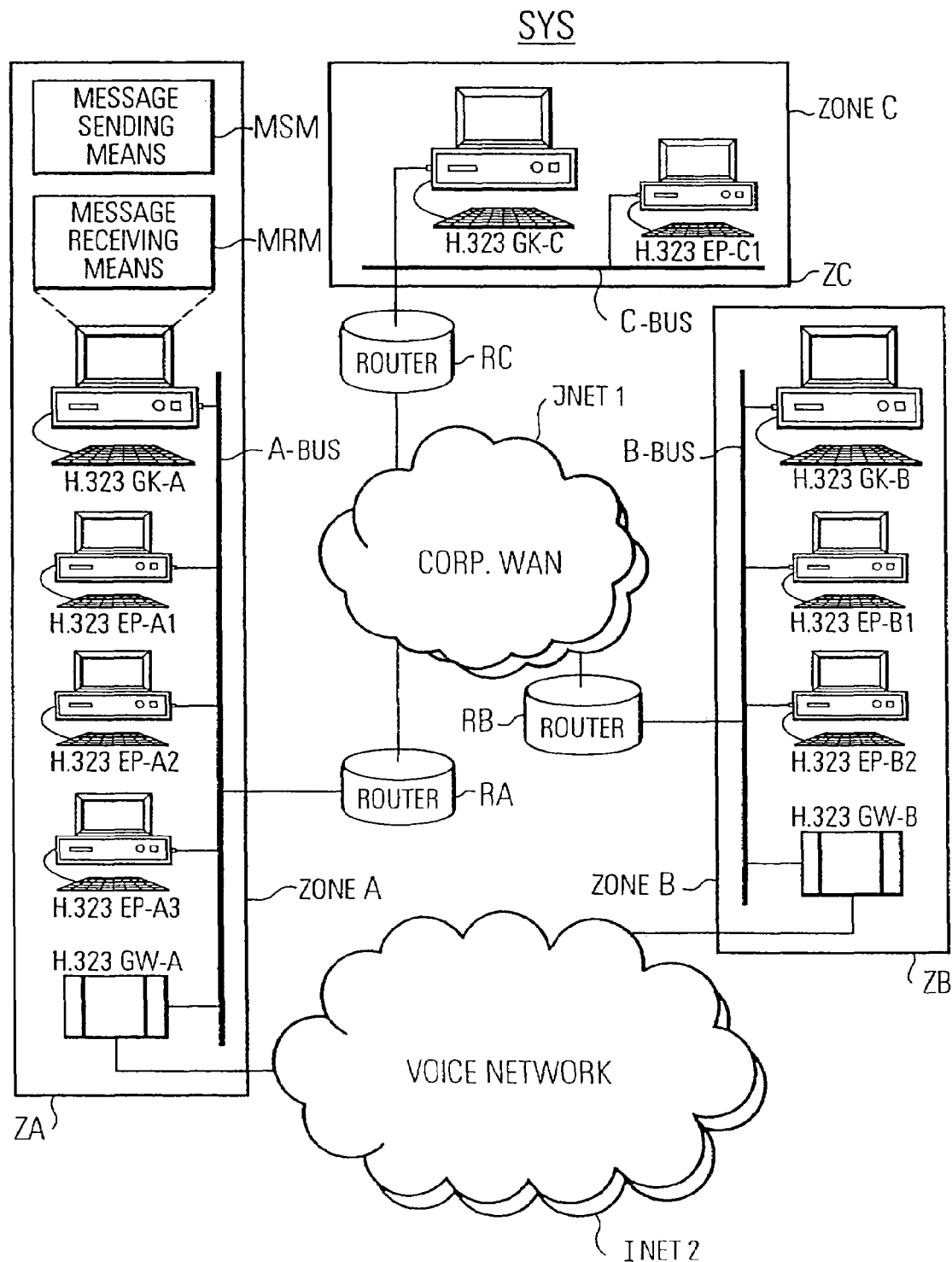
FIG. 1 illustrates a simplified block diagram of a communication system SYS in which an interconnection network INET1 is used to setup calls between subscriber stations situated in a plurality of zones ZA, ZB, ZC and controlled by respective controllers GK-A, GK-B, GK-C according to the prior art.
Figure 2A:
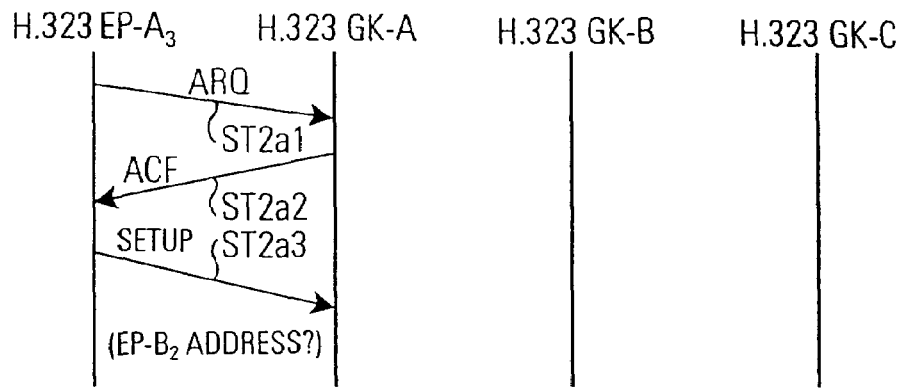
FIG. 2a shows a call setup procedure where a direct gatekeeper routing is used according to the prior art.
Figure 2B:
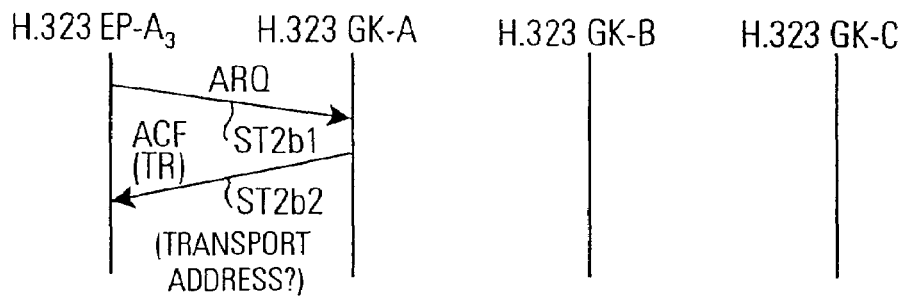
FIG. 2b shows a call setup procedure with an indirect gatekeeper routing according to the prior art.
Figure 2C:
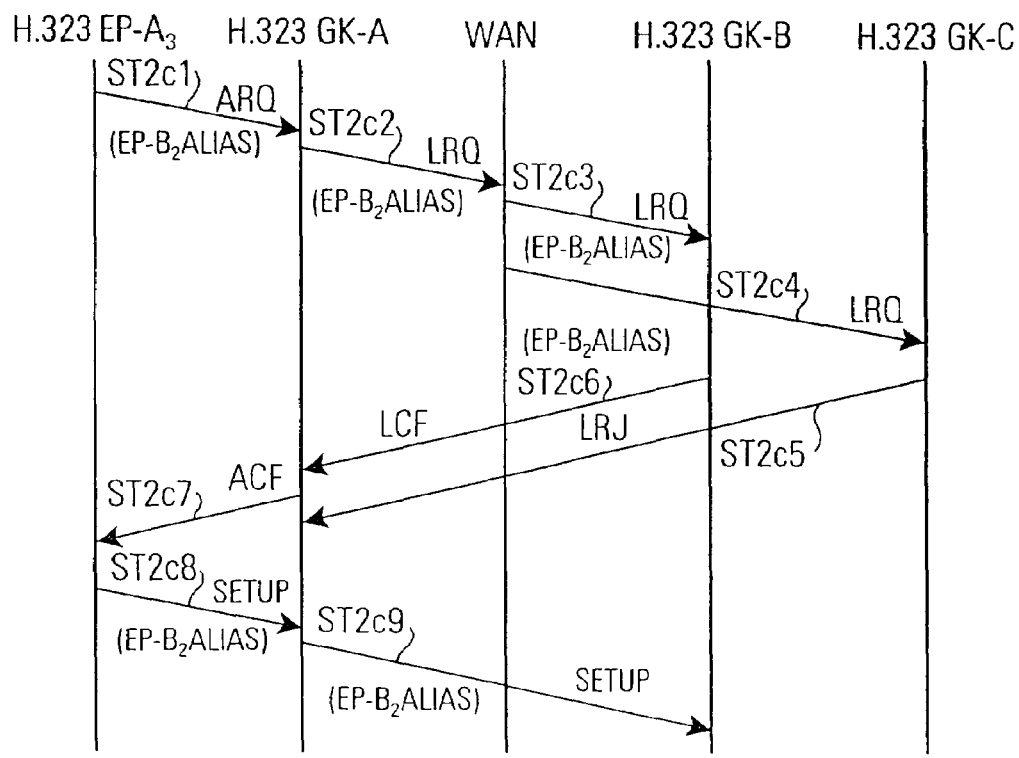
FIG. 2c shows a call setup procedure using a multicast signaling procedure of location request messages LRQ.

It should be noted that in the drawings the same or similar reference numerals denote the same or similar parts throughout. Furthermore, it should be noted that hereinafter often reference will be made to signaling messages of the H.323 and H.323v2 standards of ITU-T. However, the concept of the invention is of course equally well-applicable to similar signaling messages within other private multimedia network standards. Therefore, the invention should not be construed as being limited to these special messages.

Before coming to a more detailed discussion of the invention, some basic explanations should be made with respect to the usage of some terms like the network and transport address as shown in FIG. 9b because in the following procedures these different types of addresses are referred to.

As is well known and as is shown in FIG. 9b, the Transport Address (abbreviated TA) is the logical address of an entity located on top of the Transport layer (layer 4) of a network, as defined by the ISO Open Systems Interconnection model.

In short terms, the transport address TA is the address that identifies a running application on a given machine. However, a Network Address NA only identifies the machine itself. Therefore, although a packet might physically arrive at a given machine using only the Network Address NA, once in that machine it would not be possible to guess which of the applications running in that machine should eventually receive the packet.

As shown in FIG. 9b, usually a transport address TA is composed of a network address NA plus a so-called TSAP (Transport Service Access Point). In IP networks, for instance the TSAP is the TCP or UDP port number, while the NA is the IP address. The concatenation of the form "IP address:TCP port" or "IP address:UDP port", as for instance in 164.48.105.105:80, forms the complete transport address TA, as shown in FIG. 9b.

Any term suffixed by TA is a Transport Address used for certain purpose. For instance a RAS-Transport Address (or RASTA) is the TA which the controllers (GKs) use to receive RAS messages. "RAS" stands for Registration-Admission-Status and is a protocol used by controllers (GKs) for terminal handling purposes in H.323 (however note that with this invention this protocol is being enhanced to allow also inter-controller communication, and not only terminal handling functions).

Similarly, CSTA stands for Call Signaling Transport Address and is the address that controllers (GKs) and, optionally, endpoints, use to receive call signaling messages. Call signaling messages are those used exclusively to set-up an end-to-end communication between two or more endpoints. Such type of transport addresses are also used in the invention.

Furthermore, in the following description messages written with three uppercase letters (as, for instance, GRQ, ARQ, LRQ etc.) belong to the RAS protocol. Therefore, they are not call signaling messages and in this sense they are very different from call signaling messages like e.g. "setup". Messages belonging to the RAS protocol are local in the sense that they are exchanged between two entities (in H.323 standard only between endpoints and GKs, and with the enhancements in the invention also between GK and GK) and never go out of the scope of the two entities exchanging the RAS message. However, call signaling messages (e.g. "setup") may be global, in the sense that they may be sent from one endpoint and may travel through several GKs and GWs until eventually arriving to another endpoint.

This is the reason for some of the steps described in third embodiment, since although a RASTA might be obtained from some tables shown in FIGS. 9a, 9b in each controller, a call signaling message must never be sent to a RASTA but to a CSTA instead.

Furthermore, as already discussed above, "alias" is a generic term for referring to an E.164 number, an e-mail address etc., what is to say any identifier that might be used to find the location of the terminal to which the alias is assigned.

PRINCIPLE OF THE INVENTION

Figure 3A:
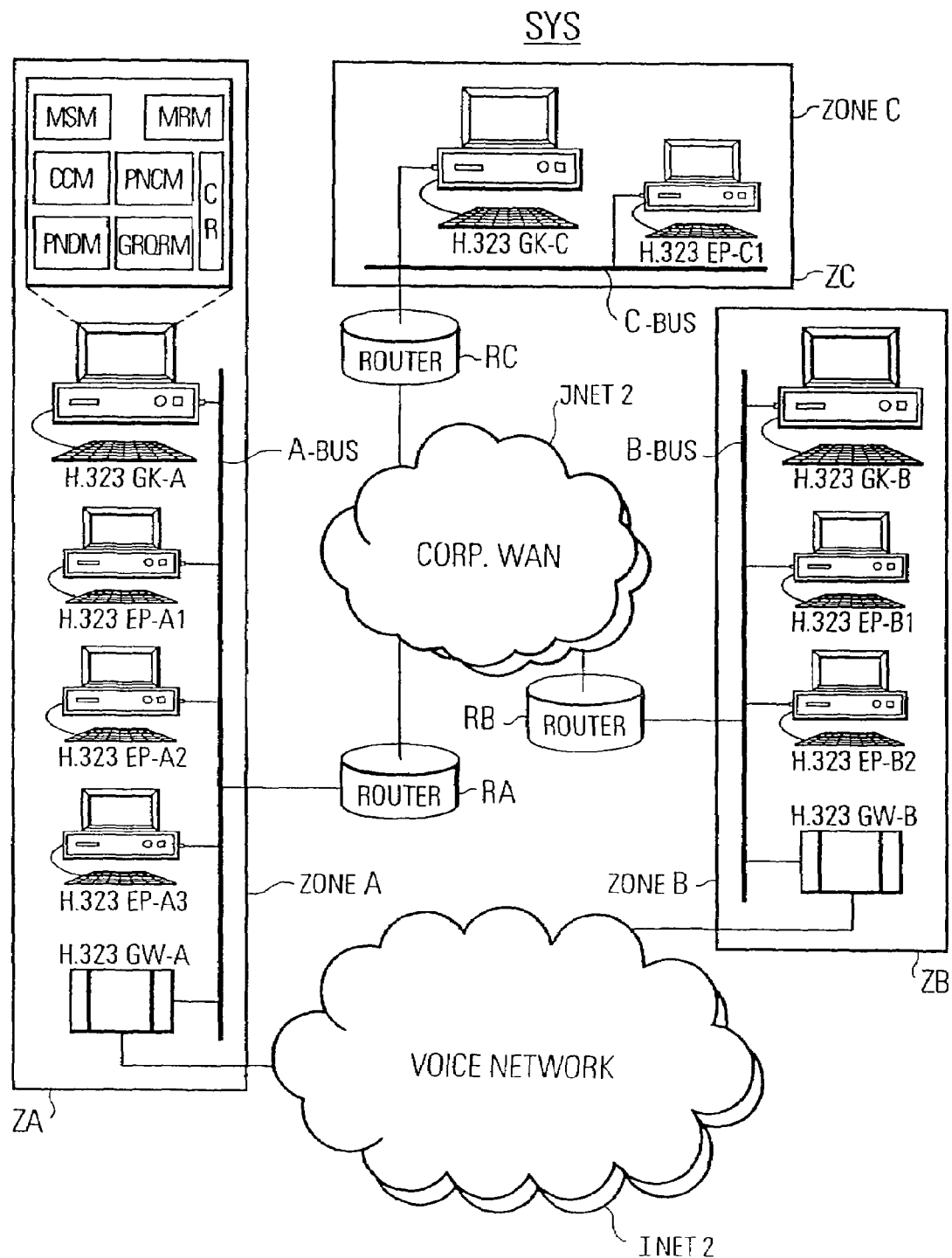
FIG. 3a shows a block diagram similar to FIG. 1 but including a block diagram of a controller GK-A according to the invention.

FIG. 3a shows a similar block diagram as FIG. 1 of the prior art. However, as can be seen from FIG. 3a, the controller GK-A in addition to the message sending means MSM and the message receiving means MRM contains a number of additional units. It should be understood that each controller controls the signaling traffic between the subscriber terminals in each zone and between different zones and has the same internal configuration as shown for the gatekeeper GK-A.

In particular, the controller according to the invention comprises a controller characteristics memory CCM, a private network configuration memory PNCM, a private network configuration determining means PNDM, a controller configuration request response means GRQRM and a call router CR which are used for the first and second aspects of the invention as explained below.

Whilst the controllers according to the prior art, as explained with reference to FIGS. 1, 2a, 2b, 2c above, have no information regarding the fact which other controllers situated in the different other zones belong to the same (own) private network and therefore must perform an exchange of signaling messages during the call setup, the invention—according to a first aspect—uses a different approach. The controller according to the first aspect of the invention comprises the controller characteristics memory CCM for storing at least a private network indentifier PNID of a private network PN to which said controller (hereinafter also called zone-specific controller) GK-A and its connected subscriber terminals EP belong. The private network configuration memory PNCM stores the private network configuration at least of the private network identified by the stored private network identifier PNID. In particular, the invention according to the first aspect comprises a private network configuration determining means PNDM for communicating with all other controllers GK-B, GK-C of the communication system SYS to determine the private network configuration including those controllers and subscriber stations in other zones which belong to the same private network identified by the private network identifier PNID stored in the memory CCM. The configuration determining means PNDM stores a corresponding private network configuration information in the private network configuration memory PNCM.

Since the controller according to the first aspect of the invention already has information about the private network configuration, namely the private network configuration information stored in the private network configuration memory PNCM, there is no necessity to carry out the identification procedure of the desired network controller in another zones via extensive signaling traffic over the network INET1. That is, according to the first aspect of the invention the configuration can be determined before a call setup (or can for example be updated at regular intervals) to provide the necessary information about the network.

Before switching on the sub-network in each zone ZA, ZB, ZB or when switching on the complete communication system SYS or in fact when adding a new sub-network in a new zone, the only information which is necessary in order to carry out the configuration process is the setting of information in the controller characteristics memory CCM. That is, first of all, before going into operation a controller (gatekeeper) is assigned a private network identifier PNID which allows the private network configuration determining means PNDM to determine to which private network the controller belongs. The only requirement for the private network configuration determining means PNDM to carry out the configuration determination process is that in fact each controller has assigned such a private network identifier to identify to which private network it belongs.

Although not needed for the configuration determination process carried out by the determining means PNDM, also other information can be set in the controller characteristics memory. For example, the controller characteristics memory CCM can further comprise the range of calling numbers CN of the subscriber terminals EP which are connected with the controller via the bus-network. This range will normally be defined by a prefix composed of E.164 digits, although more complex combinations can be used. The subscriber terminals EP which register to this specific controller from now on should have an E.164 address that belongs to the assigned range, although numbers out of this range can also be allowed when the subscriber terminals are connected in which case the additional E.164 digit not included in the range should additionally be stored in the controller characteristics memory CCM. It should be noted that the more complex the range is, the more range information will have to be kept by all the controllers in the private network. Of course, not only a single range of E.164 digits can be stored, but also several ranges. Therefore, it is recommendable to use a simple range defined by a E.164 prefix.

Furthermore, although not necessary for the configuration determination (discovery), the controller characteristics memory CCM can further store information about the call routing technique (called number based routing or location based routing, as explained below) which must be used when setting up a call to a subscriber station connected to the specific controller. That is, considering the controller as the "head" of the sub-network formed in each zone, this additional information regarding the routing technique used for reaching the respective subscriber terminals can for example indicate whether a specific controller and/or subscriber station can be reached with a direct connection and a specific routing technique. The routing techniques of "called number based" and "location based" will hereinafter be explained with more detail regarding the second aspect of the invention (routing method).

According to a second aspect of the invention, a call router CR receives from a subscriber terminal, e.g. EP-$A_3$ connected to the control GK-A, a call setup message indicating a call setup to another subscriber terminal, e.g. EP-$B_2$, and determines on the basis of the private network configuration information in the private network configuration memory the correct controller GK-B to which said called subscriber terminal EP-$B_2$ is connected, and routes the call setup message Setup to the determined controller. That is, if a private network configuration memory is provided which stores the private network configuration at least of the private network identified by a private network identifier PNID, the call router can use this stored private network configuration to immediately and before routing the setup message determine the controller (gatekeeper) with which the called subscriber terminal is connected. Therefore, as mentioned above, there is no need for heavy signaling traffic during or before the call setup, because the already stored private network configuration is already available in the controller.

It should be noted that according to the conventional H.323 standard a recognition of the gatekeeper serving the called subscriber terminal is only performed during setup and there is no permanent storage of private network identifiers or storage of the network configuration, i.e. the controllers that belong to the same private network, within each controller even before a call setup. Therefore, the information collected according to H.323 during the call setup, e.g. the controller to which the call setup message is to be routed, can by no means be regarded as a configuration stored in a memory in a controller. Therefore, the conventional H.323 procedures as explained in FIGS. 2a, 2b, 2c also do not use such configuration information for setting up a call.

Hereinafter, special embodiments of the first and second aspects of the invention will be described with more detail.

FIRST EMBODIMENT

Private Network Configuration

Before coming to a more detailed explanation of the configuration determining method according to the invention for determining the private network configuration, hereinafter the private network configuration information stored as network configuration in the private network configuration memory PNCM is described with reference to FIGS. 9a, 9b.

The private network configuration memory PNCM stores as private network configuration information the so-called RAS transport address RASTA of the respective other controllers belonging to the private network identified by the private network identifier PNID, for each RAS transport address the range RA of calling numbers (E.164 range) and connection information CNCT indicating whether a direct connection can be set up to a controller identified by the RAS transport address. FIGS. 9a, 9b show two different examples of how this information can be provided in the memory PNCM. Providing the information as shown in FIGS. 9a, 9b allows to identify the controllers that belong to the same private network as the controller holding the list, allows to identify the range of E.164 numbers which every controller in the private network handles, and allows to know whether a signaling path can be set up between the controllers in the list and the controller holding it.

In the example in FIG. 9a the private network configuration memory PNCM stores in one table the RAS transport address RASTA, the range RA and the connection information CNCT. In FIGS. 9a, 9b, the E.164 ranges stored in each controller's tables are defined by prefixing. That is, what is stored in the tables are the prefixes of the E.164 numbers that are assigned to the controller holding the table. In FIG. 9a, for instance, GK-B is in principle assigned any E.164 number which starts by any three-digit combination between 850 and__859, i.e. E.164 numbers from 850 00000 . . . to 859 99999 . . . GK-n, on the other hand, is assigned E.164 numbers 860 00000 . . . to 860 99999 . . . , 870 0000 . . . to 870 99999 . . . and 880 00000 . . . to 889 99999 . . . . This is because the number of octets needed to describe complex ranges (being the worst case when all E.164 numbers assigned are discrete, without any defined continuous range) grows exponentially, and the room available in the Non-StandardData field of the GCF messages is limited. However, it should be understood that any other designation of numbers and number ranges may be used and that the above definition is only one preferred_example.

For example, in the second row in FIG. 9a the transport address of GK-B, the supported E.164 numbers between 850-859 as well as an information (yes) that a direct path can be set up from GK-A to GK-B is stored. Of course, in FIG. 9a it is assumed that the first column only contains transport addresses of controllers GK which belong to the same private network as indicated by the private network identifier PNID stored in the controller characteristics memory. This private network identifier can be a name information ("Ericsson network"), a number ("PN1") etc. It should be noted that for the routing of calls within the (own) private network, it is necessary that each controller stores at least the information RASTA (or in general a transport address), RA and CNCT for all controllers which belong to the same private network. However, there may be a case where one zone or its respective controller (and subscriber stations) is capable of communicating in more than one private network. In this case, the characteristics memory stores several private network identifiers and the configuration memory can store a table like FIG. 9a independently for each private network.

Instead of storing several tables like in FIG. 9a, FIG. 9b shows another implementation where belongs to "PN1" and "end-to-end signaling path possible" is independently given for each controller RAS transport address. As shown in FIG. 9b, the first table TB2 holds the RAS transport address of all controllers belonging to PN1 as well as their number range. The second table TB3 lists all RAS transport addresses of controllers which can in principle be reached from the controller independently as to whether or not the controllers belong to the same private network or not. That is, the table TB3 indicates the connection information CNCT indicating the RAS transport addresses of controllers of the same private network and of other private networks to which a direct connection can be set up from the controller. With the two tables TB2, TB3 in FIG. 9b the controller can have a knowledge of multimedia network topology outside its own private network (for example in the FIG. 5 explained below, the controller GK-C does not belong to the same private network as the controller holding the list).

By using the table TB1 in FIG. 9a several times for different private networks or by using the table TB2 several times for several private networks and the table TB3 once for all controllers, the controller can have a full configuration information about its own private network and of one or more private networks. For example, if the controller is adapted to have functionalities which enable a communication through a first and second private network, alternately or simultaneously, or when the functionality is switched over from one private network to another private network, advantageously all the configuration information of the one or more other private networks is already available for routing calls, with essentially the same advantage as routing calls in a single private network.

Whilst routing methods according to the invention using the configuration information set in the tables TB1, TB2, TB3 will be explained hereinafter, now the methods of the invention will be described how the configuration determining means can determine and set the information in the private network configuration memories.

It may also be noted that the connection information CNCT can be used at any time to provide availability information of the availability status of the network. If this information and possibly the transport address TA and RA are updated at regular intervals, an actual status of the complete network regarding the availability and call connection possibilities can be maintained. Such information can be used for the call routing as will be explained with more detail below.

SECOND EMBODIMENT

Configuration Determination/Discovery

Figure 3B:
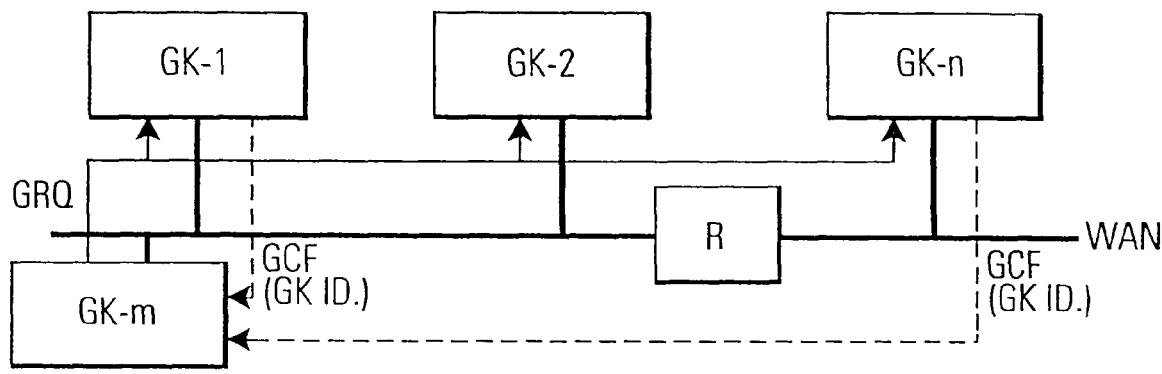
FIG. 3b shows a block diagram of the configuration determining process wherein every gatekeeper in the private network discovers all other gatekeepers which belong to said private network according to the first aspect of the invention.

Hereinafter with respect to FIG. 3b, FIG. 4 and FIG. 5 different methods are described how every controller in the private network can discover all other controllers that belong to its same private network and to which a signaling path can be set up. FIG. 3b is a simplified view illustrating the configuration determining process for an automatic discovery, wherein each controller in the private network discovers all other gatekeepers which belong to the same private network. In FIG. 3b GK-2 which is grayed is a controller which does not belong to the same private network as GK-1, GK-m and GK-n. As will be seen below with respect to FIG. 4, therefore the gatekeeper (controller) GK-2 answers to a controller configuration request message GRQ issued by GK-m with a GRJ message.

As explained above, each controller GK-1, GK-2, GK-n and GK-m has a controller characteristics memory CCM which stores at least the private network identifier to which the respective controller belongs. In order for a gatekeeper (controller) GK to know whether it has to answer such an incoming controller configuration request message GRQ, the GRQ message must carry some information which identifies the private network to which the controller belongs who issues the controller configuration request message GRQ. Within the ITU-TH.323 standard such a controller configuration request message GRQ can be the standard GatekeeperRequest (GRQ) message. If the private network is set up according to the H.323 standard, this GRQ message must carry some information regarding the private network identifier which is not present in the current version (v2) of this ITU-TH.323 standard. However, any other message according to any other private network standard may be considered as a controller configuration request message requesting other controllers to indicate information as to whether or not they belong to the same network. Therefore, also other controller configuration request messages according to other standards must at least contain the private network identifier (as for example shown in step ST41 in FIG. 4).

Figure 4:
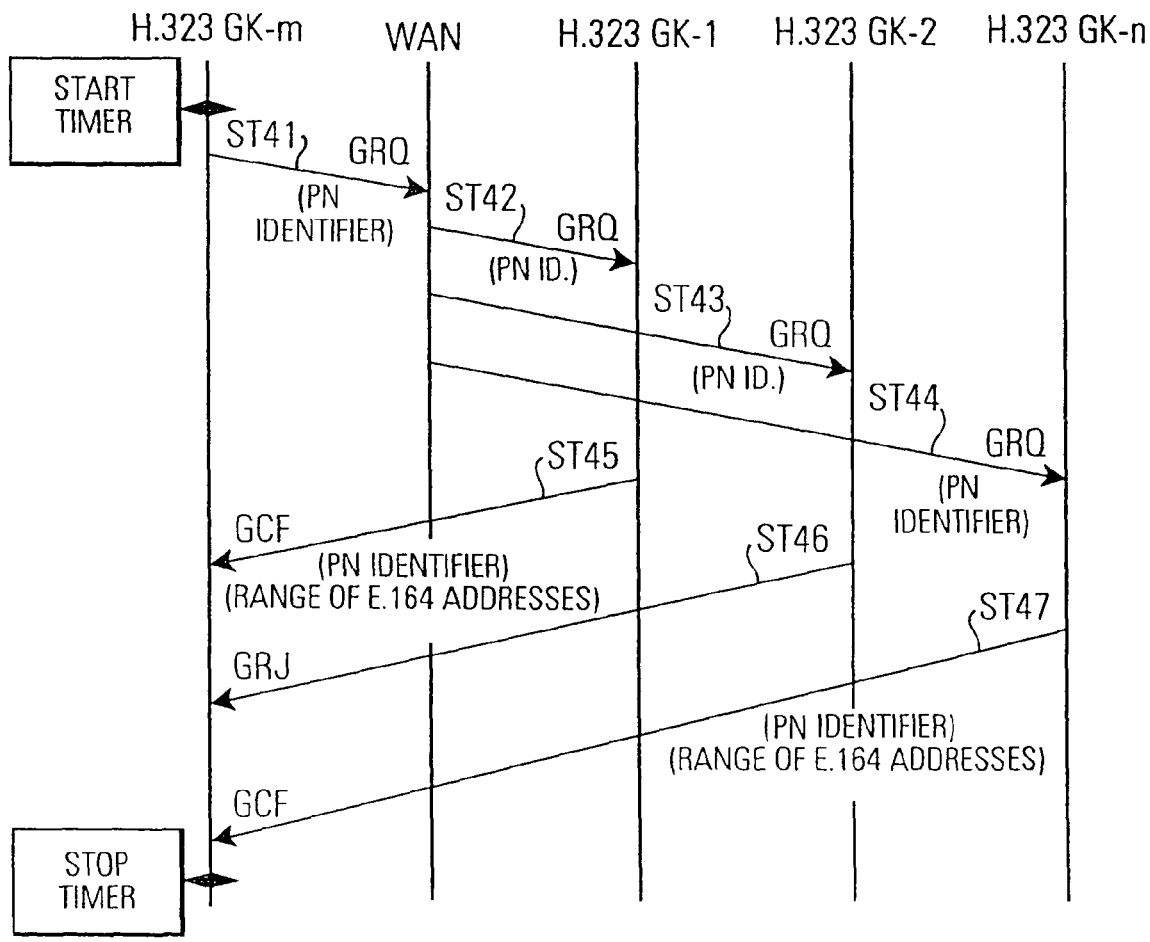
FIG. 4 shows a configuration determining method according to the first aspect of the invention when an end-to-end signaling path can be setup between all gatekeepers except for GK-2 which does not belong to the same private network as the other gatekeepers.

According to FIG. 4, the private network configuration determining PNDM of a first controller GK-m, in order to determine the private network configuration, is adapted to send through the interconnection network WAN to all other controllers GK-1, GK-2, GK-n in the communication system SYS a controller configuration request message GRQ including at least the stored private network identifier. Each controller comprises a controller configuration request response means GRQRM for sending, in response to a received controller configuration request message GRQ from another controller, to said other controller a controller configuration confirmation message GCF including at least the RAS transport address RASTA of the controller and the range RA of calling numbers CM of subscriber terminals EP to which the controller is connected if the private network identifier PNID contained in the received controller configuration request message GRQ matches the stored private network identifier PM. The private network configuration determining PNDM sets, in response to a receipt of one or more controller configuration confirmation messages GCF from one or more other controllers in its associated private network configuration memory PNCM as said private network configuration said RAS transport address RASTA and preferably the range of calling numbers CN and further preferably the connection information CNCT.

More specifically, in a private network configuration determination method according to the invention as illustrated in FIG. 4, the (inquiring) controller GK-m issues in step ST41 a controller configuration request message GRQ containing at least the private network identifier of the private network to which GK-m belongs. Within the interconnection network WAN a multicast protocol is implemented. That is, when the interconnection network WAN, INET1 receives the message GRQ, then a plurality (multicast) of request messages GRQ each including the private network identifier are directed to all controllers GK-1, GK-1, GK-n in the system SYS in steps ST42, ST43, ST44. The controller configuration request response means GRQRM compares the received private network identifier with its own stored private network identifier (stored in the characteristics memory) and if they match then a controller configuration confirmation message GCF is returned in steps ST45, ST47, e.g. from the controllers GK-1 and GK-n. Since no match was found by the controller configuration request response means GRQRM of GK-2 (since it does not belong to the private network to which GK-m, GK-1 and GK-n belong), a controller configuration rejection message GRJ is issued from the response means GRQRM of the controller GK-2. Preferably, the controller configuration request response means GRQRM echoes in the confirmation message GCF the private network identifier in order for the intended receiver of the answer to know that the controller sending it implements the private network identification check, i.e. the matching process. Furthermore, information identifying the range of E.164 numbers which the controller sending the confirmation message GCF handles is included in the confirmation message GCF.

It can be seen that after receiving the messages ST45, ST47 the issuer of the request message GRQ in step ST41 can update (originally set) its internal tables TB1, TB2, TB3 of controllers the RAS address which is received in the RAS address field of the confirmation message GCF according to whatever implementation of tables is used (FIG. 9a or FIG. 9b). This updating procedure is started after the controller issues the message ST41 at a particular time and has waited for incoming confirmation messages and rejection messages GCFs and GRJs over a period of t seconds. For each GCF or GRJ message received the controller adds an entry in its tables TB1, TB2 and TB3 and puts the RAS transport address received in the confirmation message GCF into the table.

Assuming a storage of configuration information with one table as in FIG. 9a, the controller enters the transport address, the number range and the connection information on the basis of each received confirmation message GCF. Preferably, as a security check, the entries in FIG. 9a are only made if the echoed private network identifier and the private network identifier stored in the controller coincide. If a storage as in FIG. 9a is used, it is clear that for each received confirmation message there is a "yes" regarding the connection information set in the CNCT column, because obviously when a confirmation message GCF is received the controller GK-m could set up a direct signaling path to the respective controller.

If an implementation with two tables as in FIG. 9b is used, then after the receipt of the confirmation and rejection messages within the time period of t seconds, in table TB2 for controllers which belong to the same private network identifier as the controller receiving the GCF/GRJ message the received RAS transport address is added, preferably only if the private network identifier received in the GCF message matches the one sent in GRQ. Furthermore, in table TB3, in the list of controllers to which an end-to-end signaling path is possible, the received RAS address will be added no matter what the received answer is. Therefore, since the confirmation message GCF and the rejection message GRJ each comprise at least the RAS transport address (and preferably the echoed PN identifier in case a positive match is found), all the information in tables TB1, TB2, TB3 can be set.

FIG. 11a shows the result after the configuration determining means sets the configuration information in the private network configuration memory, in particular when two tables TB2, TB3 are used. Since at least a signaling path could be set up to GK-1, GK-2 and GK-n the table TB3 respectively contains an entry of the respective transport address. In table TB2 the transport address of GK-1, GK-n and the corresponding E.164 range of numbers is stored, since both controllers GK-1, GK-n have responded with a confirmation message.

Figure 5:
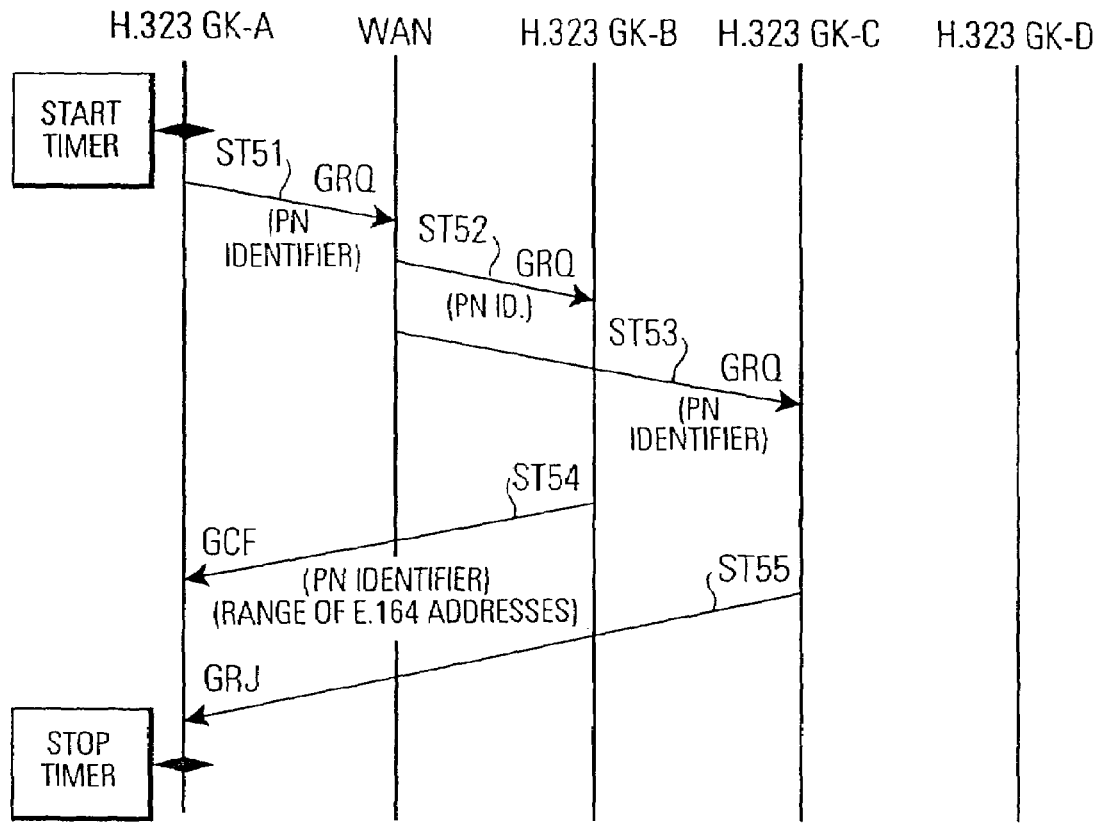
FIG. 5 shows another flow chart showing a modification of the method in FIG. 4 when an end-to-end signaling path cannot be set up between all gatekeepers and wherein one gatekeeper GK-C does not belong to the same private network as the other gatekeepers.

FIG. 5 shows another example of the configuration determination method according to the invention whereby it is here assumed that GK-A, GK-B belong to the same private network, a signaling path can be set up to GK-C which does not belong to the same private network and no signaling path can be set up to GK-D (independently as to whether it belongs to the same private network as GK-A and GK-B do or not). The messages in steps ST51, ST52 and ST53 correspond to the multicast messages in steps ST41, ST42, ST43, ST44. The confirmation message in step ST54 and the rejection message in step ST55 correspond to the messages ST45 and ST46. FIG. 11b shows the entries in table TB2, TB3 in the private network configuration memory PNCM after the controller GK-A receives the messages in steps ST54, ST55 in FIG. 5. Two controllers GK-C, GK-B can be reached (entries in the table TB3) and one controller GK-B responded with a confirmation message (entry also in TB1).

As described above, by communicating with all other controllers the private network configuration determining means PNDM of a respective controller can determine the private network configuration and store this configuration as the private network configuration in the memory PNCM to be used for the routing of calls between subscriber stations of different zones.

In the methods described with respect to FIG. 4 and FIG. 5 the request messages GRQ must contain at least a private network identifier and the response messages GCF and GRJ must contain at least the RAS transport address or a corresponding information thereto depending on the network implementation. If the network operates according to the H.323 standard either a proprietary way (H.323 standard-compliant) or a standard way (requiring standardization in H.323) can be performed.

In the proprietary way, the PN identifier of the private network to which the issuing controller belongs is included into the nonStandardData field of the GRQ message. This way requires a proprietary implementation of the controller entity. When this proprietary implementation receives a GRQ message, the response means looks into the nonStandardData field to check for a PN identifier coming into it. If such a PN identifier is found in the GRQ message, the receiving controller checks it against its own PN identifier and if they match the receiving controller sends a gatekeeper confirmation message GCF. In case the own and the received private network identifiers do not match the gatekeeper reject message GRJ is sent back to the issuing controller. In the GRJ as well as in the GCF message, the PN identifier received in the GRQ message can be echoed into the non-standard field in order for the issuing controller to realize that the response means of the controller to which the GRQ message was issued implements a private network identification check. The information regarding the range of E.164 addresses is also included in this Nonstandard Data field of the GCF answer.

FIGS. 10a, 10b show modified GRQ and GCF messages, i.e. modified on the basis of the H.323 standard. The H.323 standard uses so-called ASN.1 definitions of messages GRQ and GCF. These are amended with an additional parameter for holding a PN identifier. As indicated with "parameter according to the invention" an optional field called endpointVendor of type Vendor Identifier is added in the GRQ and GCF messages according to H.323. That is, when the communication system complies with the H.323 standard, then according to the invention even in the standard GRQ and GCF messages only one additional (OPTIONAL) parameter is inserted. In this additional parameter the GRQ message contains the private network identifier of the requesting controller and in the GCF message the parameter indicates the echoed private network identifier to indicate that the comparison process is carried out. Of course, in the additional parameter also the range of E.164 addresses can be transferred if necessary.

The skilled person realizes that other signaling procedures between the controllers can be used such that an enquiring controller obtains at least information which of the other controllers belongs to the same private network, and preferably information regarding the supported E.164 number range and the possibility of setting up a direct link to the controller.

Although the controller will preferably attempt to route an originating call setup message to a controller of its own private network, it is also possible that the controller wants to forward the call setup message to another controller of a different private network and therefore the table TB3 which indicates that at least a signaling connection can be set up to a particular RAS transport address is necessary. Of course, also table TB3 can be subdivided into those controllers which belong to the same network and controllers which belong to a different network, for example on the basis of the information obtainable from table TB2.

Also a different procedure where the interconnection network INIT1 does no have to support the internet multicast protocol for sending the request messages GRQ is possible. That is, every controller in the private network can acquire knowledge of other controllers that belong to the same private network only. First, the controller tables in each controller are updated (via communication or manually) with the RAS transport addresses of other controllers. For the private network configuration the RAS transport addresses of those controllers that compose the private network are added to the corresponding list in the controller which is currently updated (this can be done manually or via signaling). Also the range of E.164 addresses which each controller in the private network handles is inserted into a table and associated with the corresponding RAS transport address.

For the end-to-end signaling path, the RAS transport addresses of those controllers to which it is desirable to set up a H.323 call using the data network as transport are added to the corresponding list (e.g. TB3) as connection information CMCT in the controller which is currently being updated.

With this method it is actually not ensured that a H.323 call can actually be placed between two subscriber stations using the data network as transport. However, it can be ensured that a call between a calling party (e.g. EP-$A_1$) and the called party (e.g. EP-$B_1$) of a controller whose RAS transport address is not present in the corresponding list of the controller GK-A of EP-$A_1$, will be routed to a gateway belonging to the A-party's zone and will eventually arrive at the controller of the B-party via another gateway belonging to the zone ZB of the B-party. That is, even if a smaller amount of information is available, it is still possible to at least automatically route the call to the B-party.

Such a method is also recommendable when the private network has high security requirements. With this method, no non-authorized entries can fool the controllers by answering GCF to the GRQ messages. The setting of such information can be performed by a central gatekeeper facility or by an administrator (manually).

THIRD EMBODIMENT

Call Routing—Called Number Based

Having set and determined the configuration information in the private network configuration memory as described above, a call routing can take place when a subscriber station EP connected to the controller via a bus network issues a call setup request. It should be noted that in this case no extensive signaling procedures are necessary as in the prior art because the controller has already available the suitable and applicable private network configuration in its private network configuration memory PNCM.

Figure 6:
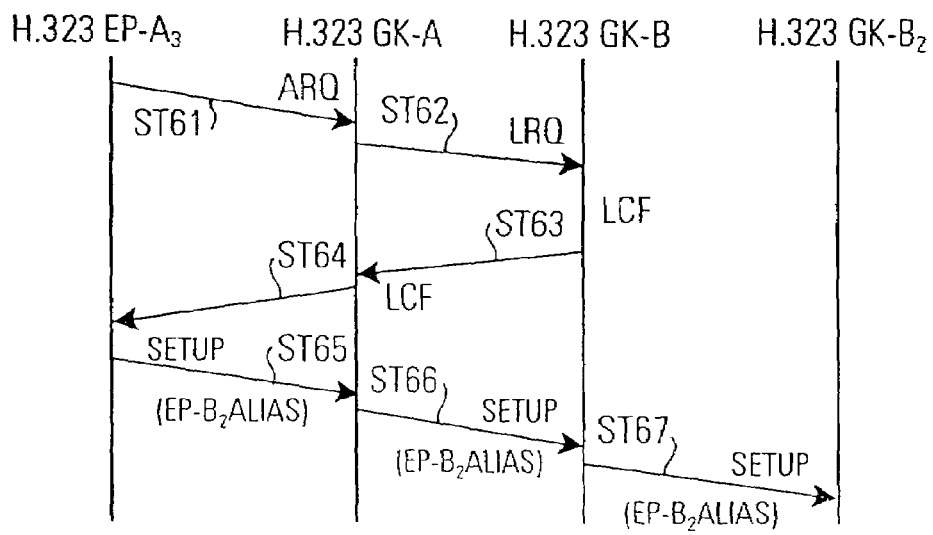
FIG. 6 shows a call routing method according to the second aspect of the invention using a gatekeeper routed call model.
Figure 7:
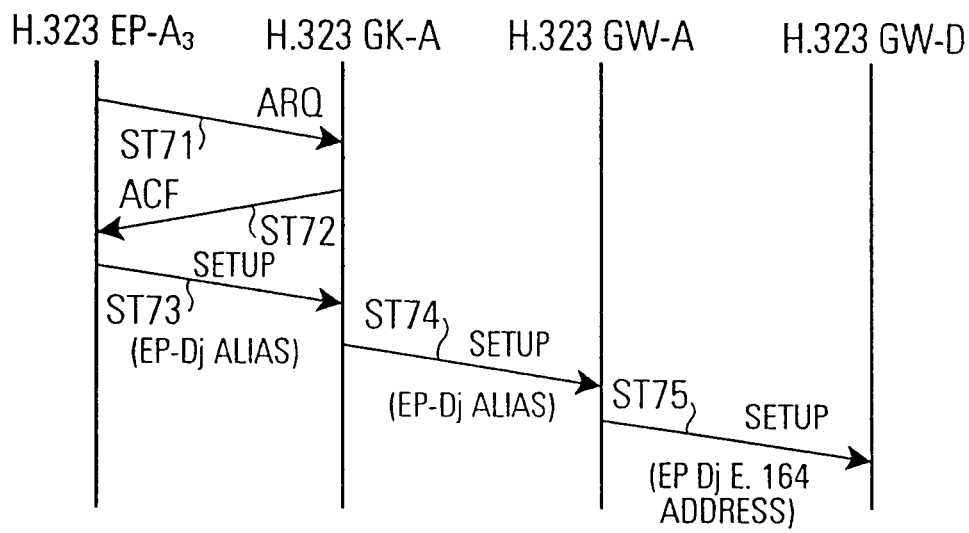
FIG. 7 shows a call setup procedure according to the second aspect of the invention when a call is routed through the second interconnection network on the basis of a Called number-routed call model.

The call routing method according to the invention will hereinafter be described with reference to FIGS. 6, 7, 8 with respect to the private network configuration definition and determination as explained above.

During a call setup a calling subscriber station EP-A$_3$ sends an ARQ (access request message) message in step ST61, ST71 to its respective controller GK-A which is in charge of the zone where the subscriber station EP-A$_3$ is located. The ARQ message contains an "alias" of the called subscriber station (for example the E.164 number) indicating to the controller GK-A that a call setup is to take place.

Now, two different methods of how the call can be routed are possible. One call routing method is the so-called "called number based call routing" (FIGS. 6, 7) in which essentially the controller GK-A uses the E.164 calling number of the called subscriber station to locate—via reference to the private network configuration stored in the memory—the controller which is serving the zone of the called subscriber station.

The second method is denoted as "location based" and essentially relates to a case where the controller GK-A does not find the E.164 calling number of the called subscriber station in the private network configuration memory. In this case the controller GK-A has no direct information about the zone where the called subscriber station is located. However, the network configuration stored in the private network configuration memory of GK-A also contains entries of all controllers which can be reached from the controller GK-A. Therefore, assuming that the called subscriber station must be located at one of the controllers indicated in the network configuration memory the controller determines the location of the called subscriber station by sending a multicast LRQ message to all the controllers which are indicated in the network configuration. Should none of the enquired controllers respond with a location confirmation message LCF, the controller GK-A can safely assume that the called subscriber station is not served by one of the enquired controllers and can therefore automatically route the call to the called subscriber station through the gateways and the second interconnection network INET2. The afore-mentioned two embodiments of the second aspect of the invention (call routing) using the network configuration information will be described hereinafter.

As is well known, the ARQ message is a RAS message, therefore it is never forwarded beyond the GK that receives it. Its purpose is to check whether enough resources (i.e. bandwidth) are available in the network for allowing a the placement of a new call. In order to guess this, a controller (GK) may need to know the called endpoint identification, and this is the reason for the called endpoint "alias" to be included in the ARQ message. A controller may use this endpoint alias for any purpose, and in the present invention it is used to match it against the range of E.164 numbers assigned to a_given controller in the called-number-based location process.

After receiving the ARQ message in step ST61 the controller GK-A tries to guess, a priori, the destination network address for the call signaling to the called subscriber station. This guess or estimate does not have to be directly the network address (e.g. XXX XXX) of the called subscriber station EP-B$_2$ because it is sufficient to guess the network address of the controller GK-B serving the called subscriber station EP-B$_2$. In order to determine the network address of the controller which serves EP-B$_2$ the controller GK-A extracts the "alias", for example the E.164 calling number, of the called subscriber station received in the request message ARQ and compares this number or "alias" with the entries in the configuration tables TB1 or TB2 (depending on which type of configurations storage is used). If the E.164 calling number belongs to one of these ranges then the controller GK-A can directly determine the RAS (RAS: Registration-Admission-Status) transport address belonging to this range.

As indicated in FIG. 9*b* and as explained above, the RAS transport address consists of the so-called network address part NA and a transport service access point identification TSAP. When the controller GK-A has read out the RAS transport address, the transport service access point identification TSAP is removed and thus the network address part NA indicating the real network address of the controller GK-B serving the called subscriber station EP-B$_2$ is determined. In case the configuration storage as in FIG. 9*a* is used, it can be determined from table TB1 whether or not a direct signaling path can be set up to the controller GK-B. If a configuration storage as in FIG. 9*b* is used then the obtained network address part NA is compared to the network address part of the RAS transport addresses in the table TB3 containing controllers to which a direct signaling path can be set up.

If it is determined on the basis of table TB1 or TB3 that an end-to-send signaling path (i.e. a direct signaling path) is possible between the controllers preferably a LRQ message is sent to the RAS transport address of the controller GK-B obtained from the controller tables as explained before. The message in step ST62 is sent to the controller GK-B in order to make sure that the called subscriber station EP-B$_2$ as identified by the E.164 calling number is actually located in the zone controlled by the determined controller GK-B with the specified RAS transport address. The reason for doing this is that after the network configuration has been determined as described above, the called subscriber station EP-B$_2$ may have moved already to a different zone and—unless the configuration setting procedure is periodically performed (as described with further details below)—the subscriber station may not be located in the zone as originally determined during the configuration setting. If in step ST63 the location confirmation message LCF is received as an answer to the LRQ message in step ST62, finally the access confirmation message ACF is returned to the calling subscriber station EP-A$_3$ in step ST64.

That is, if the controller receiving the ARQ wants to grant the endpoint sending it permission to place the call, then it sends back an ACF message, otherwise it sends back an ARJ message. If the endpoint receives ACF as answer, then the actual call is placed using call signaling message "setup" which again carries the called endpoint alias (which is recommended to include at least one E.164 number in order to be able to route the call through GWs to switched circuit_networks like e.g. PSTN). This "setup" message is the one that is forwarded to the next entity (controller, gateway or endpoint) in the call path.

Thus, in step ST65, the calling subscriber station EP-A$_3$ issues the call setup message Setup and again includes the EP-B$_2$ alias, i.e. an identification of the called subscriber station EP-B$_2$. When the controller GK-A receives the setup message Setup it routes this setup message in step ST66 to the controller GK-B which in turn routes the call setup message in step ST67 to the called subscriber station EP-B$_2$. If the communication systems operates according to the H.323 standard, then the controller GK-A will—after receiving the setup message in step ST65—add the Call Signaling TSAP (TSAP: Transport Service Access Point identification) to the network address NA of the determined controller GK-B. This transport address resulting from adding the TSAP to the network address NA is then used as the transport address to which the call signaling is routed.

If in response to the LRQ in step ST62 a location request rejection message LRJ (instead of the confirmation message LCF) is received then the controller GK-A determines that the called subscriber station EP-B$_2$ is obviously not located at the intended location. Then, there are three different possibilities to proceed.

Firstly, to determine the actual location of the called subscriber station EP-B$_2$, the controller GK-A can perform a new configuration determination process as explained above. That is, whenever a new subscriber station EP-B$_2$ registers in a new zone, the calling number range including the new calling number of the newly registered subscriber station will be available at the respective controller. Therefore, if the controller GK-A carries out a new configuration determination it will be possible to determine to which new zone the called subscriber station EP-B$_2$ has moved. Then the process in FIG. 6 can be repeated and will be successful because the new location will now answer with a location confirmation message LCF (step ST63).

A second possibility is that the gatekeeper GK-A simply rejects the call setup if the controller GK—in its characteristics memory—is only identified as being capable to perform call routing on the basis of the "called number based routing". As explained above, in the characteristics memory, during the initialization of the gatekeeper, a parameter can be stored which indicates the call routing techniques which the controller can carry out.

Thirdly, if the controller GK-A is identified as being capable of other call routing methods, i.e. the "location based routing" as explained below then this other call routing method (i.e. the determination of the network address of the controller serving the called subscriber station) is carried out.

Of course, with the provision of the second interconnection network INET2 there is always the possibility to route the call through the gateways GW-A and GW-B if none of the afore-mentioned three possibilities are successful. That is, as shown in FIG. 7, if in response to access request message ARQ in step ST71 the controller GK-A determines that no match of calling numbers is found in the tables TB1, TB2, TB3 of controllers to which an end-to-end signaling path is possible, it is assumed that an end-to-end signaling path is not possible between subscriber stations and therefore, in response to the setup message in step ST73, the controller GK-A routes to call signaling to the gateway GW-A belonging to the zone of the subscriber station EP-A$_3$. The call is then routed to the gateway GW-D belonging to the zone where the call subscriber station EP-D$_j$ is assumed to be located. FIG. 7 corresponds to the scenario where the called subscriber station EP-D$_j$ belongs to the zone controlled by the controller GK-D (as in the example in FIG. 5) to which no direct signaling path can be set up.

Furthermore, it should also be noted that the fall-back to INET2 through GWs does not have to be taken only as a last resource when all other methods have failed, but might be taken at any moment, for example during the endpoint location process, wherein this moment can be determined for instance based on controller configuration parameters.

FOURTH EMBODIMENT

Call Routine—Location Based

The second embodiment of the second aspect (gatekeeper-to-gatekeeper-location based routing) relates to the case where the E.164 called party number is not found in the tables TB1-TB3. In such a case, the gatekeeper GK-A could try a query to a name server, location server or any other means available in the communication system SYS in order to obtain the network address of the controller serving the called subscriber station. However, if the network address of the destination controller is eventually not found, the following procedure as indicated in FIG. 8, hereinafter called the "location based routing technique" is carried out. FIG. 8 is also used if in the controller characteristics memory the controller itself is not configured for the "called number based call routing" but only for the "location based call routing".

The second routing technique "location based call routing" assumes that a multicast signaling procedure is available in the first interconnection network WAN (INET1). In response to a controller request message GRQ in step ST81 the controller GK-A sends several (multicast) location request messages LRQ to the respective controllers GK-B, GK-C, GK-D whose transport addresses are held in the table TB1 or TB2 of controllers belonging to its own private network, in steps ST82, ST83, ST84. This message enquires at the respective controller as to whether or not the called subscriber station EP-B$_2$ is located at the controller. In order for the enquired controller to respond, the respective location request message contains an indication (alias) of the called subscriber station EP-B$_2$. Of course, the location request messages LRQ are only sent to such controllers to which, according to the connection information CNCT in the table TB1 or TB3 a direct signaling connection can be set up. The indication (alias(es)) included in the location request message LRQ has been obtained from the calling subscriber station EP-A$_3$ in the ARQ message (which is for simplicity not again show in FIG. 8).

Figure 8:
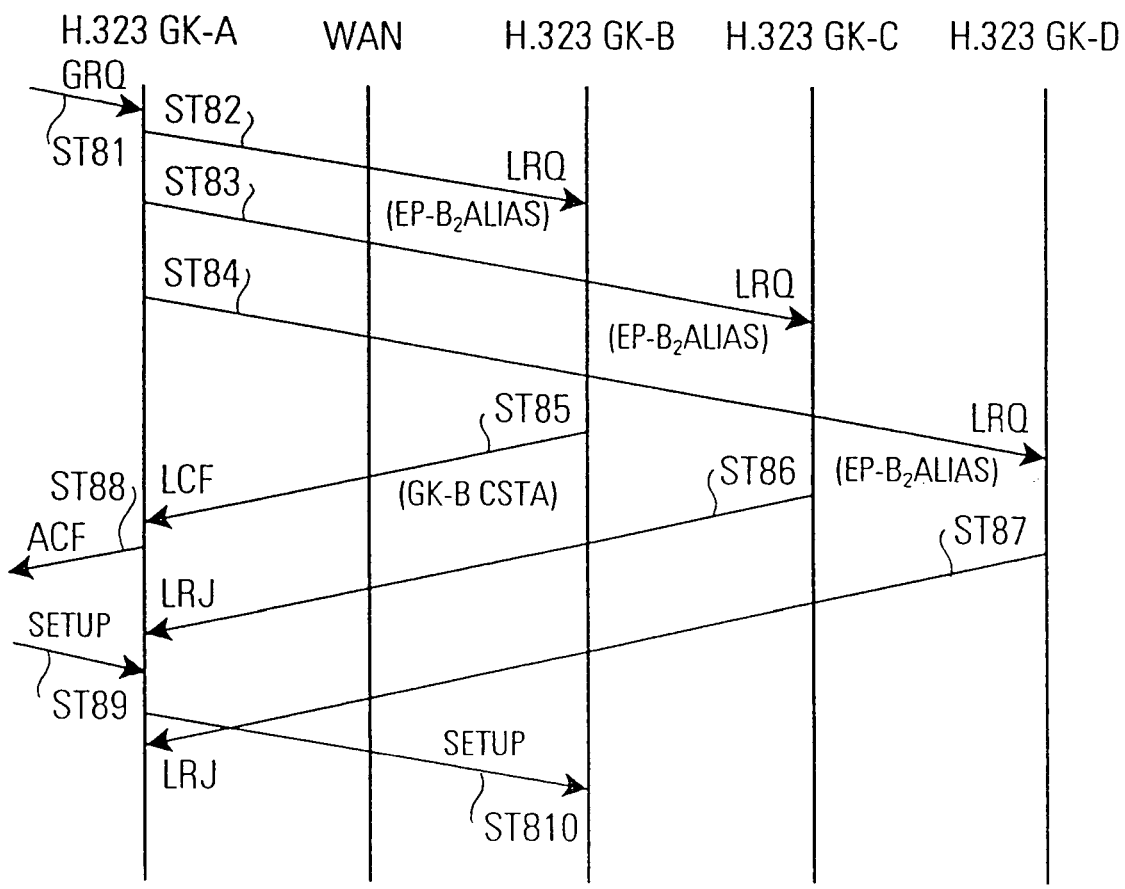
FIG. 8 shows a call setup procedure using a gatekeeper to gatekeeper location based call routing method.
Figure 3A:
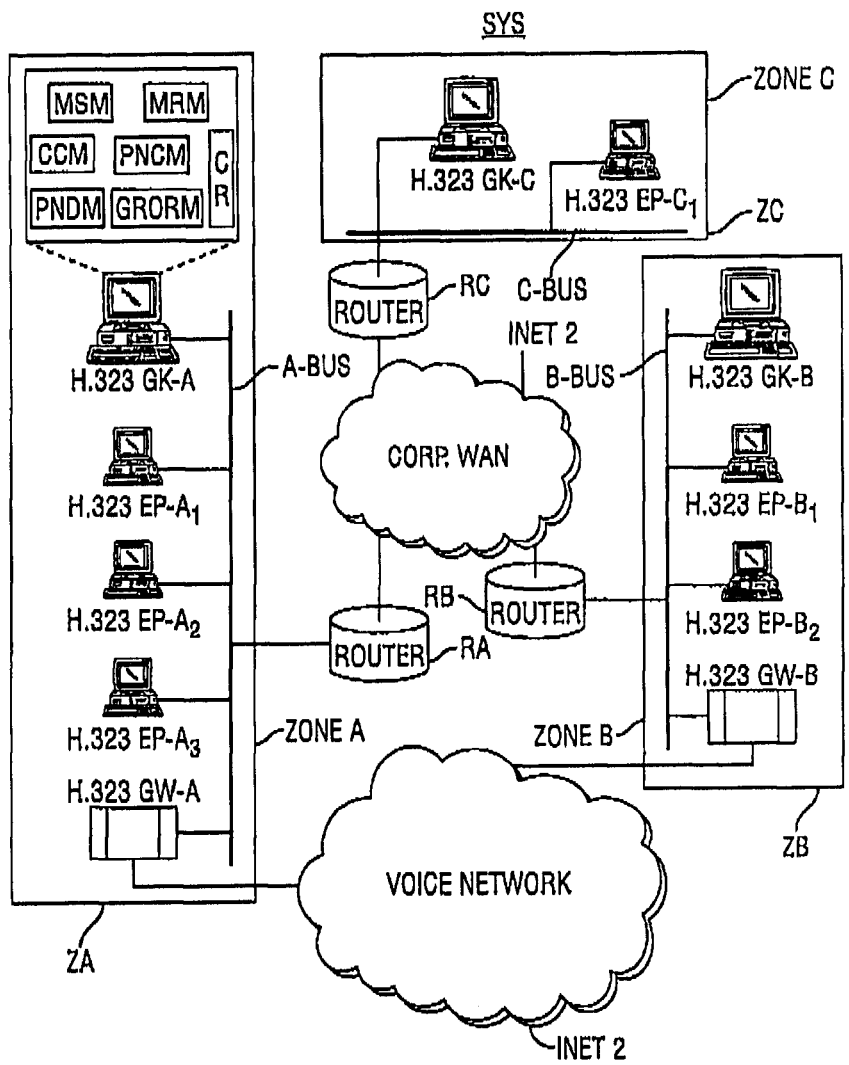

As indicated in FIG. 8, in response to the multicast LRQ message, one of the controllers (GK-B) responds with a location confirmation message LCF in step ST85, whilst the other two controllers GK-C, GK-D respond with a location rejection message LRQ in steps ST86, ST87. That is, since the controller GK-B finds that the subscriber station identified by the alias (es) in the location request message LRQ belongs to its own zone, it sends back the location confirmation message LCF. In the location confirmation message the controller GK-B inserts his own Call Signaling Transport Address (hereinafter CSTA). Such insertion of this special address is for example part of the conventional H.323v2 standard. However, the skilled person realizes that in other standards similar addresses indicating the network address of the controller GK-B can be inserted.

When the controller GK-A receives in step ST85 the confirmation message LCF, it stores the indicated transport address (call signaling transport address) in its memory, e.g. at a corresponding entry in one of the tables TB1-TB3. It then issues the confirmation message ACF in step ST88 to the calling subscriber station EP-A$_3$. The calling subscriber station EP-A$_3$ then issues in step ST89 the setup message containing the alias of the called subscriber station EP-B$_j$ and, since the call signaling transport address CSTA is already stored in one of the tables TB1-TB3, the call setup message is now routed to the indicated CSTA of the controller GK-B. If a new LCF message is received after the confirmation message ACF has been issued to the calling subscriber station EP-A$_3$ in step ST88, this new LCF message is disregarded. If no location confirmation message LCF is received as answer to the multicast LRQ messages, this indicates that the called subscriber station EP-D$_j$ is out of the private network or has moved to a zone to which an end-to-end signaling path cannot be set up. In this case, the procedure in FIG. 7 is followed, i.e. the call will be set up through the gateways GW-A, the second interconnection network INET2 and the gateway GW-D.

Therefore, the private network configuration confirmation stored in the private network configuration is on the one hand used for determining the responsible controller of the called subscriber station and on the other hand, if the private network configuration information does not indicate a suitable controller (or controller address), the call can be automatically routed through the second network because, if the configuration information does not indicate a suitable controller, it can safely be assumed that the called subscriber station cannot be reached via the private network. This is also true for the case where several tables for several private networks with which a controller can communicate are stored in the configuration memory. That is, even if the trying of several controllers belonging to several different private networks does not lead to a successful call setup, it can be safely assumed that there is no private network that can be used for reaching the called subscriber station in which case the call is routed through the gateway and the second interconnection network.

FIFTH EMBODIMENT

Automatic Configuration Updating

As already mentioned above, of course, from time to time the network configuration can change due to different conditions. For example, a subscriber station may move from one zone to another zone or be simply disconnected from the network. Furthermore, it is also possible that additional controllers (gatekeepers) or zones are added or that a zone is completely shut down. That is, the network configuration even within a single private network does not remain constant over time. Therefore, to always have the most actual account of the network configuration, the private network configuration determining means PNDM is adapted to determine the private network configuration and to store corresponding private network configuration information in the private network configuration memory at repeated time intervals to update the configuration information in the private network configuration memory. That is, the above described configuration determining methods, for example the one in FIG. 5 or FIG. 4 can be carried out repeatedly. As explained above with reference to FIG. 4, at the very beginning the controller GK-m has no information about the number or the location of other controllers GK-1, GK-2, GK-n or whether or not a direct connection can be set up to the controllers. Then, a multicast GRQ message sending is performed (or the respective information is manually set in the respective configuration memory).

During an updating procedure (re-discovery procedure) for the network configuration the situation is slightly different to the initial configuration determination. For a re-configuration determination there are already tables TB1, TB2 and TB3 containing RAS transport addresses for controllers which at least during the initial configuration determination were recognized. If multicast GRQ message sending for a re-configuration determination is not supported in the first interconnection network INET1 it is still possible that a single GRQ message carrying the PN identifier of the sending controller is forwarded to each and every of the RAS transport addresses held in the tables TB1-TB3 of controllers belonging to the same private network as the controller sending the GRQ message. Of course, this will only lead to a determination of controllers inside the private network to which the sending controller belongs, i.e. only the possibility of setting up end-to-end signaling connections to zones belonging to the private network can be investigated.

Whenever a re-configuration determination is carried out, all tables TB1-TB3 are cleared to avoid that old entries and new entries are present simultaneously in the configuration memory because these entries may be incompatible or inconsistent.

Of course, during the configuration determination or re-configuration determination there is no possibility to set up calls because the controller is busy with the configuration determination. To at least allow the setting up of calls during a re-configuration determination process, preferably two private network configuration memories can be provided each holding one or two tables TB1-TB3 depending on the technique for storing the configuration information (one table or two tables). By providing two memories, the old private network configuration can be used for setting up calls whilst a new private network configuration is set in the other memory. Once the re-configuration determination process is over, the old lists in the first memory are deleted and the temporary lists stored in the second memory are stored in place of the permanent lists in the first memory. Of course, the first and second memory can be different memory sections in a single memory.

Furthermore, although in many of the drawings the H.323 standard is mentioned, it should be noted that the special signaling messages shown in the figures are not exclusive to the H.323 standard. Therefore, these messages are only representatives of other messages which can be used similarly according to other private network standards. Therefore, the invention is not restricted to the special H.323 standard.

INDUSTRIAL APPLICABILITY

The present invention can be applied to any communication system SYS including in a plurality of geographically distant zones a zone-specific controller and one or more subscriber terminals connected to each other via a zone-specific bus network wherein said zone-specific bus networks are connected to each other via at least a first corporate network WAN. The corporate network can be a corporate multimedia network, a circuit switched network or a packet switched network. The controllers can control the signaling traffic in particular between H.323 subscriber terminals. The present invention in particular finds applicability in the Voice over Internet Protocol technology (V/IP) framed by the ITU-T H.323 standards. However, any other private or corporate data network (multimedia network) according to other standards are applicable to the invention.

Furthermore, it should be noted that various modifications and variations are possible on the basis of the above teachings. The invention also comprises embodiments which comprise features which have been listed and described separately in the description and in the claims. The scope of the invention is however not limited by the embodiments described above and further embodiments are obvious to a skilled person on the basis of the above teachings. Reference numerals in the claims only serve clarification purposes and do not limit the scope of these claims.

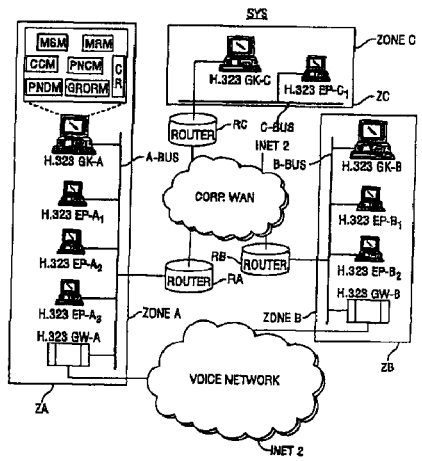

The invention claimed is:

1. A zone-specific controller (GK) of a communication system (SYS) including in each of a plurality of geographically distant zones (ZA, ZB, ZC) a different zone-specific controller (GK) and one or more subscriber terminals (EP) connected to each other via a zone-specific bus network (BUS-A, BUS-D, BUS-C), said zone-specific bus networks being connected to each other via at least one interconnection network (WAN), wherein said zone-specific controller (GK) controls the signaling traffic between the subscriber terminals (EP) in each zone and between different zones and comprises:

a) a controller characteristics memory (CCM) for storing at least a private network identifier (PNID) of a private network (PN) to which said zone-specific controller (GK) and its connected subscriber terminals (EP) belong;

b) a private network configuration memory (PNCM) for storing the private network configuration at least of the private network identified by the stored private network identifier (PNID);

c) a private network configuration determining means (PNDM) for communicating (GRQ, GCF, GRJ) with all other controllers (GK) of the communication system (SYS) to determine the private network configuration including those controllers (GK) and subscriber stations (EP) in other zones (B, C) which belong to the private network (PN) identified by the stored private network identifier (PNID) and to store corresponding private network configuration information (TA; RA; CNCT) in said private network configuration memory (PNCM).

2. The zone-specific controller according to claim 1, characterized in that said controller characteristics memory (CCM) is further adapted to store the range of calling numbers (RA) of the subscriber terminals (EP) which are connected with the controller (GK) via the bus-network.

3. The zone-specific controller according to claim 1 or 2, characterized in that said controller characteristics memory (CCM) is further adapted to store information about the call routing technique (called number based routing or location based routing) which must be used when setting up a call to a subscriber station (EP) connected to the controller.

4. The zone-specific controller according to claim 1, characterized in that said private network configuration memory (PNCM) is adapted to store as private network configuration information (RASTA; RA; CNCT) the RAS transport address (RASTA) of respective other controllers (GK) belonging to the private network identified by the private network identifier, for each RAS transport address (RASTA) the range (RA) of calling numbers and connection information (CNCT) whether a direct connection can be set up to a controller (GK) identified by the RAS transport address (RASTA).

5. The zone-specific controller according to claim 4, characterized in that said private network configuration memory (PNCM) is adapted to store as said private network configuration information (RASTA; TA; CNCT) in one table (TB1) the RAS transport address (RASTA) of respective other controllers (GK) belonging to the private network identified by the private network identifier, for each RAS transport address (RASTA) the range of calling numbers and the connection information (CNCT) whether a direct connection can be set up to a controller (GK) identified by the RAS transport address (RASTA).

6. The zone-specific controller according to claim 4, characterized in that said private network configuration memory (PNCM) is adapted to store as private network configuration information (RASTA; RA; CNCT) in a first table (TB2) the RAS transport address (RASTA) of respective other controllers (GK) belonging to the private network identified by the private network identifier (PNID) and for each RAS transport address (RASTA) the range (RA) of calling numbers, and in a second table (TB3) the RAS transport addresses (RASTA) of controllers of the same private network (PN) and other private networks to which a direct connection can be set up from the controller.

7. The zone-specific controller according to claim 1, characterized by said private network configuration determining means (PNDM), in order to determine the private network configuration, being adapted to send through the interconnection network (WAN) to all other controllers (GK) in the communication system (SYS) a controller configuration request message (GRQ) including at least the stored private network identifier (PNID); a controller configuration request response means (GRQRM) for sending, in response to a controller configuration request message (GRQ) from another controller (GK), to said other controller (GK) a controller configuration confirmation message (GCF) including at least the RAS transport address (RASTA) of the controller and the range (RA) of calling numbers (CN) of subscriber terminals (EP) to which the controller (GK) is connected if the private network identifier (PNID) contained in the received controller configuration request message (GRQ) matches the stored private network identifier (PN); and said private network configuration determining means (PNDM) setting, in response to a receipt of one or more controller configuration confirmation messages (GCF) from one or more other controllers, in its associated private network configuration memory (PNCM) as said private network configuration said RAS transport address (RASTA) and said range (RA) of calling numbers (CN).

8. The zone-specific controller according to claim 7, characterized in that said controller configuration request response means (GRQRM) is adapted for sending, in response to a controller configuration request message (GPQ) from another controller (GK), a controller configuration rejection message (GRJ) if the private network identifier (PNID) contained in the received controller configuration request message (GRQ) does not match the private network identifier (PN) stored in the controller characteristics memory (CCM).

9. The zone-specific controller according to claim 1, characterized in that the controller (GK) further comprises a call router (CR) for receiving from a subscriber terminal (e.g. EP-A.sub.3) connected to said controller (GK) a call setup message (ARQ) indicating a call setup to another subscriber terminal (e.g. EP-B.sub.2), for determining on the basis of the private network configuration information (RASTA. RA, CNCT) in the private network configuration memory (PNCM) the controller (GK) to which said called subscriber terminal (e.g. EP-B.sub.2) is connected, and for routing the call setup message (ARQ) to the determined controller.

10. The zone-specific controller according to claim 1, characterized in that said private network configuration determining means (PNDM) is adapted to determine the private network configuration and to store corresponding private network configuration information (RASTA; RA; CNCT) in said private network configuration memory (PNCM) at repeated time intervals to update the configuration information in the private network configuration memory.

11. A zone-specific controller (GK) of a communication system (SYS) including in each of a plurality of geographically distant zones (A, B, C), a different zone-specific controller and one or more subscriber terminals (EP) connected to each other via a zone-specific bus network (BUS-A, BUS-D, BUS-C), said zone-specific bus networks being connected to each other via at least one interconnection network (WAN), wherein the zone-specific controller (GK) controls the signaling traffic between the subscriber terminals (EP) in each zone and between different zones and comprises:
  a) a private network configuration memory (PNCM) for storing the private network configuration at least of the private network identified by a private network identifier (PNID); and
  b) a call router (CR) for receiving from a subscriber terminal (e.g. EP-A.sub.3) connected to said controller (GK) a call setup message (ARQ) indicating a call setup to-another subscriber terminal (e.g. EP-B.sub.2), for determining on the basis of the private network configuration information (RASTA, RA, CNCT) in the private network configuration memory (PNCM) the controller (GK) to which said called subscriber terminal (e.g. EP-B.sub.2) is connected, and for routing the call setup message (ARQ) to the determined controller.

12. The zone-specific controller according to claim 11, characterized in that said private network configuration memory (PNCM) stores as private network configuration information (RASTA; RA; CNCT) at least the RAS transport address (RASTA) of respective other controllers (GK) belonging to the private network identified by the private network identifier, for each RAS transport address (RASTA) the range (RA) of calling numbers (E.164 range) and connection information (CNCT) whether a direct connection can be set up to a controller (GK) identified by the RAS transport address.

13. A zone-specific controller according to claim 12, characterized in that said private network configuration memory (PNCM) stores as said private network configuration information (RASTA; NR; CNCT) in one table (TB1) the RAS transport address (RASTA) of respective other controllers (GK) belonging to the private network identified by the private network identifier, for each RAS transport address (RASTA) the range (RA) of calling numbers (E.164 range) and the connection information (CNCT) whether a direct connection can be set up to a controller (GK) identified by the RAS transport address (RASTA).

14. The zone-specific controller according to claim 12, characterized in that said private network configuration memory (PNCM) stores as private network configuration information (RASTA; RA; CNCT) in a first table (TB2) the RAS transport address (RASTA) of respective other controllers (GK) belonging to the private network identified by the private network identifier and for each RAS transport address (RASTA) the range of calling numbers, and in a second table (TB3) the RAS transport addresses of controllers of the same private network and other private networks to which a direct connection can be set up from the controller.

15. The zone-specific controller according to claim 12, characterized in that said call router (CR) determines the controller (GK) to which the call setup message (ARQ) is to be routed by carrying out the following steps for number-based call routing:
  b1) comparing (ST61) the calling number of the called subscriber terminal (EP-B2) in the call setup message (ARQ) with the ranges of calling numbers (CN) in said private network configuration memory (PNCM) and if a match is found:
  b2) reading out the RAS transport address associated to a range of calling numbers into which said calling number falls;
  b3) removing the transport address part (Ta) of the readout RAS transport address (RASTA) to determine the network address of the controller (GK) to which the called subscriber terminal is connected; and wherein
  b4) said call router (CR) routes (ST66, ST67) the call setup message (ARQ) to the determined network address of the controller (GK).

16. The zone-specific controller according to claim 15 and 14, characterized in that said call router (CR) determines the controller (GK) to which the call setup message (ARQ) is to be routed by further carrying out a further step:
  b5) in which the determined network address (NA) is compared with the network part of RAS transport addresses (RASTA) of controllers (GK) stored in the second table (TB3) in which controllers are indicated to which a direct signaling connection can be built up.

17. The zone-specific controller according to claim 16, characterized in that said call router (CR) determines the controller (GK) to which the call setup message (ARQ) is to be routed by further carrying out a further step
  b6) in which said call router (CR) sends (ST62; ST82, ST83, ST84) a location enquiry message (LRQ) to the determined RAS transport address (RASTA).

18. The zone-specific controller according to claim 17, characterized in that if said call router (CR) in response to sending (ST62) said location enquiry message (LRQ) to said determined RAS transport address (RASTA) receives (ST86, ST87) a location reject message (LRJ), said call router (CR) routes (ST74, ST75) said call setup message to the called subscriber station (EP-B.sub.2) via a first gateway (GW-A) connected to the bus-network (A-BUS) with which the calling subscriber terminal (EP-A.sub.3) is connected, a second interconnection network (VOICE, INET2) connected to the first gateway (GW-A) and a second gateway (GW-B) connected to the second interconnection network (VOICE. INET2) and to the bus network (B-BUS) to which the called subscriber terminal (EP-B2) is connected.

19. The zone-specific controller according to claim 12, characterized in that said call router (CR) determines the controller (GK) to which the call setup message (ARQ) is to be routed by carrying out the following steps for location-based call routing:
  b7) comparing the calling number of the called subscriber terminal (EP-B.sub.2) in the call setup message (ARQ) with the ranges of calling numbers (CN) in said private network configuration memory (PNCM) and if no match is found:
  b8) sending (ST82, ST83, ST84) a location enquiry message (LRQ) including a called subscriber terminal indication (EP-B alias) to each transport address (RASTA) of controllers (GK) which are indicated as belonging to the private network identified by said stored private network identifier (PNID) and to which a direct signaling connection can be setup;
  b9) sending (ST810), in response to receiving a location confirmation message (LCF) including a call signaling transport address (CSTA) from one of the controllers (GK) to whose zone (B) the called subscriber terminal (EP-B.sub.2) belongs, the setup message setup to said call signaling transport address (CSTA).

20. The zone-specific controller according to claim 12, characterized by said controller (GK) further comprising a controller characteristics memory (CCM) for storing information about the call routing technique (called number based routing or location based routing) which must be used when setting up a call to a subscriber station connected to the controller (GK).

21. The zone-specific controller according to claim 19 or claims 15 and 20, characterized in that said call router (CR)

uses the call routing technique according to steps b1)-b5) if said call routing technique indicates a called number based routing and uses the call routing technique according to steps b7)-b9) if said call routing technique indicates a location based routing.

22. A method for routing calls in a communication system (SYS) including in each of a plurality of geographically distant zones (ZA,. ZB, ZC) a zone-specific controller (GK) and one or more subscriber terminals (EP) connected to each other via a zone-specific bus network (BUS-A, BUS-D, BUS-C), said zone-specific bus networks being connected to each other via at least one interconnection network (WAN), wherein said controller (GK) controls the signaling traffic between the subscriber terminals (EP) in each zone and between different zones and carries out the following steps:
  a) storing in a controller characteristics memory (CCM) for storing at least a private network identifier (PNID) of a private network (PN) to which said zone-specific controller (GK) and its connected subscriber terminals (EP) belong;
  b) storing in a private network configuration memory (PNCM) for storing the private network configuration at least of the private network identified by the stored private network identifier (PNID); and
  c) communicating (GRQ. GCF, GRJ) with all other controllers (GK) of the communication system (SYS) to determine the private network configuration including those controllers (GK) and subscriber stations (EP) in other zones (B, C) which belong to the private network (PN) identified by the stored private network identifier (PNID) and to store corresponding private network configuration information (RASTA; RA; CNCT) in said private network configuration memory (PNCM).

23. A method for call routing in a communication system (SYS) including in each of a plurality of geographically distant zones (A, B, C) a zone-specific controller (GK) and one or more subscriber terminals (EP) connected to each other via a zone-specific bus network (BUS-A, BUS-D, BUS-C), said zone-specific bus networks being connected to each other via at least one interconnection network (WAN), wherein the controller (GK) controls the signaling traffic between the subscriber terminals (EP) in each zone and between different zones and carries out the following steps:
  a) storing a private network configuration memory (PNCM) for storing the private network configuration at least of the private network identified by a private network identifier (PNID);
  b) receiving from a subscriber terminal connected to said controller (GK) a call setup message (ARQ) indicating a call setup to another subscriber terminal;
  c) determining on the basis of the private network configuration information (RASTA, RA, CNCT) in the private network configuration memory (PNCM) the controller (GK) to which said called subscriber terminal is connected; and
  d) routing the call setup message (ARQ) to the determined controller.

* * * * *

UNITED STATES PATENT AND TRADEMARK OFFICE
CERTIFICATE OF CORRECTION

PATENT NO. : 7,356,040 B2
APPLICATION NO. : 10/182955
DATED : April 8, 2008
INVENTOR(S) : Parra-Moyano et al.

It is certified that error appears in the above-identified patent and that said Letters Patent is hereby corrected as shown below:

The title page showing the illustrative figure should be deleted to be replaced with the attached title page.

On the Cover Page, item (57), under "ABSTRACT", in Column 2, Line 8, delete "determing" and insert -- determining --, therefor.

On the Cover Page, item (57), under "ABSTRACT", in Column 2, Line 14, delete "setting-up" and insert -- setting up --, therefor.

On Page 2, item (56), under "OTHER PUBLICATIONS", in Column 2, Line 4, delete "Inter-Gaterkeeper" and insert -- Inter-Gatekeeper --, therefor.

In the drawings:

In Fig. 1, Sheet 1 of 9, for Tag "ZC", delete "H.323 EP-C1" and insert -- H.323 EP-$C_1$ --, therefor.

In Fig. 1, Sheet 1 of 9, delete Tag "JNET 1" and insert Tag -- INET1 --, therefor.

In Fig. 1, Sheet 1 of 9, for Tag "ZA", delete "H.323 EP-A1" and insert -- H.323 EP-$A_1$ --, therefor.

In Fig. 1, Sheet 1 of 9, for Tag "ZA", delete "H.323 EP-A2" and insert -- H.323 EP-$A_2$ --, therefor.

In Fig. 1, Sheet 1 of 9, for Tag "ZA", delete "H.323 EP-A3" and insert -- H.323 EP-$A_3$ --, therefor.

In Fig. 1, Sheet 1 of 9, for Tag "ZB", delete "H.323 EP-B1" and insert -- H.323 EP-$B_1$ --, therefor.

In Fig. 1, Sheet 1 of 9, for Tag "ZB", delete "H.323 EP-B2" and insert -- H.323 EP-$B_2$ --, therefor.

The drawing sheet, consisting of Fig. 3a, should be deleted to be replaced with the drawing sheet, consisting of Fig. 3a, as shown on the attached page.

Signed and Sealed this

Twenty-fourth Day of August, 2010

David J. Kappos
*Director of the United States Patent and Trademark Office*

In Fig. 10a, Sheet 8 of 9, Line 12, delete "CryptoH323Token" and insert -- CryptoH.323Token --, therefor.

In Fig. 10b, Sheet 8 of 9, Line 12, delete "CryptoH323Token" and insert -- CryptoH.323Token --, therefor.

In Column 2, Line 54, delete "G-B." and insert -- GW-B. --, therefor.

In Column 3, Line 15, delete "CK-A" and insert -- GK-A --, therefor.

In Column 4, Line 14, delete "the_Transport" and insert -- the Transport --, therefor.

In Column 4, Line 28, delete "G-A," and insert -- GK-A, --, therefor.

In Column 4, Line 38, delete "GB-B" and insert -- GK-B --, therefor.

In Column 6, Line 28, delete "h.323" and insert -- H.323 --, therefor.

In Column 6, Line 36, delete "h.323" and insert -- H.323 --, therefor.

In Column 8, Line 57, delete "(claim 23)" and insert -- (claim 24) --, therefor.

In Column 11, Line 22, delete "H.323" and insert -- H.323; --, therefor.

In Column 11, Lines 22-23, delete "10b standard modified in.........the invention;" and insert -- Fig. 10b standard modified in.........the invention; --, therefor on Line 23.

In Column 12, Line 65, delete "indentifier" and insert -- identifier --, therefor.

In Column 15, Line 19, delete "and_859," and insert -- and 859, --, therefor.

In Column 15, Line 30, delete "preferred_example." and insert -- preferred example. --, therefor.

In Column 15, Line 53, delete "belongs to "PN1"" and insert -- "belongs to PN1" --, therefor.

In Column 17, Line 45, delete "GK-1," and insert -- GK-2, --, therefor.

In Column 19, Line 21, delete "nonStandardData" and insert -- NonStandardData --, therefor.

In Column 19, Lines 24-25, delete "nonStandardData" and insert -- NonStandardData --, therefor.

In Column 20, Line 10, delete "INIT1" and insert -- INET1 --, therefor.

In Column 21, Line 51, delete "a_given" and insert -- a given --, therefor.

In Column 22, Line 50, delete "circuit_networks" and insert -- circuit networks --, therefor.

In Column 28, Line 34, in Claim 8, delete "(GPQ)" and insert -- (GRQ) --, therefor.

CERTIFICATE OF CORRECTION (continued)
U.S. Pat. No. 7,356,040 B2

In Column 28, Line 47, in Claim 9, delete "(RASTA. RA" and insert -- (RASTA, RA --, therefor.

In Column 29, Line 30, in Claim 13, delete "A" and insert -- The --, therefor.

In Column 29, Line 59, in Claim 15, delete "(EP-B2)" and insert -- (EP-$B_2$) --, therefor.

In Column 30, Line 34, in Claim 18, delete "(VOICE. INET2)" and insert -- (VOICE, INET2) --, therefor.

In Column 30, Line 35, in Claim 18, delete "(EP-B2)" and insert -- (EP-$B_2$) --, therefor.

In Column 31, Line 8, in Claim 22, delete "(ZA,. ZB" and insert -- (ZA, ZB --, therefor.

In Column 31, Line 25, in Claim 22, delete "(GRQ. GCF" and insert -- (GRQ, GCF --, therefor.

(12) United States Patent
Parra-Moyano et al.

(10) Patent No.: US 7,356,040 B2
(45) Date of Patent: Apr. 8, 2008

(54) COMMUNICATION SYSTEM, METHOD AND CONTROLLER FOR ROUTING CALLS WITHIN PRIVATE NETWORKS DISTRIBUTED AMONG GEOGRAPHICALLY DISTANT ZONES

(75) Inventors: Francisco Parra-Moyano, Madrid (ES); Javier Perez Fernandez, Madrid (ES); Jesus-Javier Arauz-Rosado, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1205 days.

(21) Appl. No.: 10/182,955

(22) PCT Filed: Jan. 10, 2001

(86) PCT No.: PCT/EP01/00237
§ 371 (c)(1),
(2), (4) Date: Dec. 24, 2002

(87) PCT Pub. No.: WO01/58091
PCT Pub. Date: Aug. 9, 2001

(65) Prior Publication Data
US 2004/0008710 A1 Jan. 15, 2004

(30) Foreign Application Priority Data
Feb. 4, 2000 (DE) .................. 100 04 811

(51) Int. Cl.
*H04M 7/00* (2006.01)
(52) U.S. Cl. .............. 370/422; 370/395.2; 370/395.31; 370/400; 370/402
(58) Field of Classification Search ........ 370/352–356, 370/373–374, 377–379, 381–385, 395.2, 370/395.3, 395.32, 401–405, 422, 395.31, 370/400, 402; 709/212–213, 220, 223, 227–229, 709/238, 244
See application file for complete search history.

(56) References Cited
U.S. PATENT DOCUMENTS
5,650,994 A * 7/1997 Daley ............... 370/259
(Continued)

FOREIGN PATENT DOCUMENTS
EP 0989705 A2 3/2000
(Continued)

OTHER PUBLICATIONS
Radhika R. Roy, "Distributed Gatekeeper Architecture of H.323-based Multimedia Telephony,", IEEE 1999, pp. 73-76.
(Continued)

*Primary Examiner*—Binh K. Tieu

(57) ABSTRACT

A controller (GK) of a communication system (SYS) including in each of a plurality of geographically distant zones (ZA, ZB, ZC) a zone-specific controller (GK) and one or more subscriber terminals (EP) comprises a controller characteristics memory (CCM) for storing at least a private network identifier (PNID), a private network configuration memory (PNCM) for storing the private network configuration, a private network configuration determining means (PMDM) for communicating with other controllers (GK) of the communication system to determine the private network configuration and a call router for routing a call setup message received from a subscriber terminal (EP-A$_3$) in one zone (ZA) to another subscriber terminal (EP-B$_2$) of another zone (ZB). Before setting-up a call or at repeated time intervals the private network configuration including the controllers and subscriber stations in all zones (ZA, ZB, ZC) which belong to the private network identified by the private network identifier (PNID) can be determined and this private network configuration is used for determining the location of the respective controller which serves the called subscriber station (EP-B$_2$).

23 Claims, 9 Drawing Sheets